(12) United States Patent
Ito et al.

(10) Patent No.: US 9,083,187 B2
(45) Date of Patent: Jul. 14, 2015

(54) ELECTRIC ENERGY STORAGE APPARATUS CAPABLE OF AC OUTPUT

(75) Inventors: Kazushige Ito, Fussa (JP); Tsutomu Sekido, Fussa (JP); Masatoshi Uno, Sagamihara (JP); Akio Kukita, Sagamihara (JP)

(73) Assignees: Japan Aerospace Exploration Agency, Tokyo (JP); Japan Capacitor Industrial Co., LTD., Tokyo (JP)

( * ) Notice: Subject to any disclaimer, the term of this patent is extended or adjusted under 35 U.S.C. 154(b) by 770 days.

(21) Appl. No.: 13/411,483

(22) Filed: Mar. 2, 2012

(65) Prior Publication Data

US 2012/0200163 A1   Aug. 9, 2012

Related U.S. Application Data

(63) Continuation of application No. PCT/JP2010/063697, filed on Aug. 12, 2010.

(30) Foreign Application Priority Data

Sep. 2, 2009   (JP) ................................ 2009-202633

(51) Int. Cl.
*H02J 7/00* (2006.01)
*H01M 10/44* (2006.01)
(Continued)

(52) U.S. Cl.
CPC ........... *H02J 7/0014* (2013.01); *H01M 10/441* (2013.01); *H01M 2010/4271* (2013.01); *H02J 7/345* (2013.01)

(58) Field of Classification Search
USPC ........................................................ 320/118
See application file for complete search history.

(56) References Cited

U.S. PATENT DOCUMENTS 3,100,851 A    8/1963  Ross
4,238,820 A   12/1980  Naaijer
(Continued)

FOREIGN PATENT DOCUMENTS

CN        1057133 A    12/1991
CN      101297458 A    10/2008
(Continued)

OTHER PUBLICATIONS

Guo, et al., "Comparison and Evaluation of Charge Equalization Technique for Series Connected Batteries," Proc. IEEE PESC 2006, pp. 1-6.

*Primary Examiner* — Edward Tso
*Assistant Examiner* — Robert Grant
(74) *Attorney, Agent, or Firm* — McDermott Will & Emery LLP

(57) ABSTRACT

An electric energy storage apparatus can generate an AC output in a low-loss and low-noise manner without using a DC-DC converter or an inverter. The electric energy storage apparatus comprises: an electric energy storage module group formed by connecting in series electric energy storage modules each comprising one or more electric energy storage elements; a balancing circuit electrically connected to the electric energy storage module group and configured to adjust a voltage to be applied to each of the electric energy storage modules; a first switch group comprising switches each in a path connecting a first terminal and a terminal of one of the series-connected electric energy storage modules; and a second switch group comprising switches each in a path connecting a second terminal and a terminal of one of the series-connected electric energy storage modules. The electric energy storage apparatus may perform a switch changeover in the switch groups.

15 Claims, 15 Drawing Sheets

(51) Int. Cl.
*H02J 7/34* (2006.01)
*H01M 10/42* (2006.01)

(56) References Cited

U.S. PATENT DOCUMENTS

| | | |
|---|---|---|
| 5,453,643 A | 9/1995 | Yang |
| 5,483,433 A | 1/1996 | Yang |
| 5,659,237 A | 8/1997 | Divan et al. |
| 5,710,504 A | 1/1998 | Pascual et al. |
| 7,453,237 B2 | 11/2008 | Yamamoto |
| 7,898,223 B2 | 3/2011 | Takeda et al. |
| 2006/0103349 A1 | 5/2006 | Yamamoto |
| 2008/0252266 A1 | 10/2008 | Bolz et al. |
| 2009/0134851 A1 | 5/2009 | Takeda et al. |
| 2009/0273321 A1 | 11/2009 | Gotzenberger et al. |
| 2011/0057617 A1 | 3/2011 | Finberg et al. |
| 2012/0194138 A1 | 8/2012 | Uno et al. |
| 2012/0200163 A1 | 8/2012 | Ito et al. |

FOREIGN PATENT DOCUMENTS

| | | |
|---|---|---|
| CN | 100514741 C | 7/2009 |
| JP | 54-126931 A | 10/1979 |
| JP | 2-123928 A | 5/1990 |
| JP | 06-225462 A | 8/1994 |
| JP | 07-115728 A | 5/1995 |
| JP | 8-182212 A | 7/1996 |
| JP | 08-308249 A | 11/1996 |
| JP | 10-32936 A | 2/1998 |
| JP | 2000-209775 A | 7/2000 |
| JP | 2002-345157 A | 11/2002 |
| JP | 2003-134686 A | 5/2003 |
| JP | 2007-166691 A | 6/2007 |
| JP | 2007-312517 A | 11/2007 |
| JP | 2008-219964 A | 9/2008 |

ELECTRIC ENERGY STORAGE APPARATUS CAPABLE OF AC OUTPUT

CROSS-REFERENCES TO RELATED APPLICATIONS

This application is a continuation of International Patent Application No. PCT/JP2010/063697 filed on Aug. 12, 2010, which claims priority from Japanese Patent Application No. 2009-202633 filed on Sep. 2, 2009, all of which are hereby incorporated by reference in their entirety for all purposes.

FIELD

The present invention relates to an electric energy storage apparatus. More specifically, the present invention relates to an electric energy storage apparatus capable of generating an AC output in a low-loss and low-noise manner without using a DC (direct current)-DC converter and an inverter.

BACKGROUND

As one example of a power supply for generating an AC (alternating current) voltage, there is a type based on a system designed to convert a voltage held by electric energy storage means such as a capacitor, through a DC-DC converter and an inverter.

FIG. 1 illustrates a typical circuit configuration of such an AC power supply. This electric energy storage apparatus comprises: electric energy storage means; a discharge circuit; a DC/DC converter; and an inverter.

Generally, when a certain electronic device is operated by electric power, it is necessary to supply electric power within a predetermined operating voltage range which is determined by characteristics of the device. This is because, although an electronic device can adequately operate within a predetermined voltage range depending on individual characteristics of the device, it becomes operationally unstable or becomes non-operative if a supply voltage changes to a value out of the operating voltage range. Therefore, in the above AC power supply, it is essential to perform control for allowing an output voltage therefrom to fall within a certain range, primarily based on the DC-DC converter.

Patent Document 1: JP 2008-219964 A
Patent Document 2: JP H06-225462 A
Patent Document 3: JP S54-126931 A
Patent Document 4: U.S. Pat. No. 3,100,851 B
Patent Document 5: JP 2007-166691 A
Patent Document 6: JP H07-115728 A
Patent Document 7: JP 2002-345157 A

SUMMARY

According to an aspect of the present invention, there is provided an electric energy storage apparatus which comprises: an electric energy storage module group formed by connecting in series two or more electric energy storage modules each comprising one or more electric energy storage elements; a balancing circuit electrically connected to the electric energy storage module group and configured to adjust a voltage to be applied to each of the electric energy storage modules; a switch group comprising two or more switches each provided in a path connecting a first connection point and a terminal of one of the series-connected electric energy storage modules; a positive-negative inversion circuit having, as an input section, the first connection point and a second connection point electrically connected to one of the terminals of the series-connected electric energy storage modules, wherein the positive-negative inversion circuit is configured to connect the first connection point and the second connection point to one of output terminals, respectively; electric energy storage module voltage detection means configured to detect a voltage across the electric energy storage module; switch group control means configured to, based on the electric energy storage module voltage detected by the electric energy storage module voltage detection means, and a voltage magnitude in a target output voltage waveform at a certain clock time, turn on one of the switches comprised in the switch group; and positive-negative inversion circuit control means configured to, based on a voltage polarity in the target output voltage waveform at the certain clock time, select the output terminals to be connected to the first connection point and the second connection point, in the positive-negative inversion circuit, wherein the electric energy storage apparatus is configured to, depending on the magnitude and polarity of the target output voltage waveform, and the electric energy storage module voltage, perform a switch changeover in the switch group, and a selection of the output terminals to be connected to the first and second connection points in the positive-negative inversion circuit, so as to select a magnitude of an output voltage depending on a configuration of the electric energy storage elements present in a path connecting the first and second connection points, and select a polarity of the output voltage depending on the output terminals connected to respective ones of the first and second connection points, to output a voltage having the target output voltage waveform.

The above electric energy storage apparatus is configured to select a magnitude of the output voltage by the switch changeover in the switch group, and is free of the need for a conventional DC-DC converter using a coil or a transformer. A voltage generated from the electric energy storage module group to have a desired magnitude selected by the switch changeover is subjected to polarity (positive-negative) conversion by the positive-negative inversion circuit according to need, and then output through the output terminals.

In the above electric energy storage apparatus, a voltage across each of the electric energy storage modules is adjusted by the balancing circuit, so that it is possible to adjust the output voltage in increments of the adjusted voltage.

In cases where an element having a large voltage change, such as a capacitor, is used as the electric energy storage element, it is desirable to monitor a temporally-changing voltage by the electric energy storage module voltage detection means. This is because, even when one of the switches is fixedly turned on, a capacitor voltage will be gradually lowered due to discharging, so that it is necessary to frequently perform the switch changeover so as to obtain an output voltage within an operating range. The electric energy storage module voltage detection means may be any suitable device configured to measure a voltage and output an analog or digital signal depending on the measured voltage.

In one aspect, preferably, the switch changeover depending on a voltage change in the electric energy storage element and a target voltage is performed by the switch group control means. In cases where a semiconductor switch, such as a MOSFET, is used as each of the switch, the switch group control means may be any switch driver composed, for example, of an RF oscillation circuit.

As one example of the switch driver, it is possible to use a programmable switch driver configured to compare the electric energy storage module voltage detected by the electric energy storage module voltage detection means with a voltage of the target waveform, to determine an optimal switch changeover state, and then generate a changeover signal to the switch group. However, it is not essential for the switch group control means to have the above configuration. For example, the comparison operation may be performed by any suitable comparison and calculation circuit. Further, it is not essential that the electric energy storage module voltage detection means and the switch group control means are formed as individual separate means, but they may be formed as a single device having their functions.

The above electric energy storage apparatus configured to adjust an output voltage to conform to a target voltage at a certain clock time makes it possible to adjust the output voltage at intervals of a predetermined period of time to output a voltage in an arbitrary pattern, regardless of whether it is a DC voltage or an AC voltage.

In addition, according to an aspect of the present invention, there is provided an electric energy storage apparatus which comprises: an electric energy storage module group formed by connecting in series two or more electric energy storage modules each comprising one or more electric energy storage elements; a balancing circuit electrically connected to the electric energy storage module group and configured to adjust a voltage to be applied to each of the electric energy storage modules; a switch group comprising two or more switches each provided in a path connecting a first connection point and a terminal of one of the series-connected electric energy storage modules; and a positive-negative inversion circuit having, as an input section, the first connection point and a second connection point electrically connected to one of the terminals of the series-connected electric energy storage modules, wherein the positive-negative inversion circuit is configured to connect the first connection point and the second connection point to one of output terminals, respectively, and wherein the electric energy storage apparatus is configured to perform a switch changeover in the switch group so as to select a magnitude of an output voltage depending on a configuration of the electric energy storage elements present in a path connecting the first and second connection points, and cause the positive-negative inversion circuit to select a polarity of the output voltage depending on the output terminals connected to respective ones of the first and second connection points.

As each of the aforementioned control means, it is possible to use any external device. In this case, the external devices may be appropriately connected to the above electric energy storage apparatus in use. The object of the present invention can also be achieved in this manner.

In addition, according to an aspect of the present invention, there is provided an electric energy storage apparatus which comprises: an electric energy storage module group formed by connecting in series two or more electric energy storage modules each comprising one or more electric energy storage elements, wherein each of the electric energy storage modules is connected to a constant-voltage DC power supply; a switch group comprising two or more switches each provided in a path connecting a first connection point and a terminal of one of the series-connected electric energy storage modules; and a positive-negative inversion circuit having, as an input section, the first connection point and a second connection point electrically connected to one of the terminals of the series-connected electric energy storage modules, wherein the positive-negative inversion circuit is configured to connect the first connection point and the second connection point to one of output terminals, respectively, and wherein the electric energy storage apparatus is configured to perform a switch changeover in the switch group so as to select a magnitude of an output voltage depending on a configuration of the electric energy storage elements present in a path connecting the first and second connection points, and cause the positive-negative inversion circuit to select a polarity of the output voltage depending on the output terminals connected to respective ones of the first and second connection points.

The above electric energy storage apparatus is configured such that a DC power supply is connected to each of the electric energy storage modules, instead of using the balancing circuit. As one example, a constant-voltage DC power supply may be connected to each of the electric energy storage modules. This makes it possible to adjust the output voltage without taking into account a voltage drop in each of the electric energy storage modules.

The electric energy storage apparatus according to the present invention may further comprise: voltage detection means configured to detect a voltage across the electric energy storage module; first switch-group control means configured to, based on the electric energy storage module voltage detected by the voltage detection means, and a voltage magnitude in a target output voltage waveform at a certain clock time, turn on one of the switches comprised in the switch group; and positive-negative inversion circuit control means configured to, based on a voltage polarity in the target output voltage waveform at the certain clock time, select the output terminals to be connected to the first connection point and the second connection point, in the positive-negative inversion circuit, wherein the electric energy storage apparatus is configured to, depending on the magnitude and polarity of the target output voltage waveform, and the electric energy storage module voltage, control the switch group and the positive-negative inversion circuit to output a voltage having the target output voltage waveform.

Alternatively, the electric energy storage apparatus according to an aspect of the present invention may further comprise: voltage detection means configured to detect a voltage across a load connected to the output terminals; first switch-group control means configured to, based on the load voltage detected by the voltage detection means, and a voltage magnitude in a target output voltage waveform at a certain clock time, turn on one of the switches comprised in the switch group; and positive-negative inversion circuit control means configured to, based on a voltage polarity in the target output voltage waveform at the certain clock time, select the output terminals to be connected to the first connection point and the second connection point, in the positive-negative inversion circuit, wherein the electric energy storage apparatus is configured to, depending on the magnitude and polarity of the target output voltage waveform, and the load voltage, control the switch group and the positive-negative inversion circuit to output a voltage having the target output voltage waveform.

The electric energy storage apparatus may be configured to directly detect the load voltage, instead of the electric energy storage module voltage, and adjust the output voltage based on the detected load voltage. A specific mathematical relationship is established between the electric energy storage module voltage and the load voltage, depending on one of the switches to be selectively turned on. Thus, it is only necessary to detect one of them so as to adjust an output voltage.

The electric energy storage apparatus according to an aspect of the present invention may further comprise: load voltage detection means configured to detect a voltage across a load connected to the output terminals; and second switch-group control means configured to, based on a voltage in the target output voltage waveform at a certain clock time, and a load voltage detected at the certain clock time by the load voltage detection means, turn on one of the switches comprised in the switch group, wherein the electric energy storage apparatus is configured to adjust the load voltage to conform to the voltage in the target output voltage waveform at the certain clock time, by charging and discharging between the load and the electric energy storage module connected to the load through the switch turned on by the second switch-group control means.

In cases where an AC voltage is output to a load including a reactive element such as a coil and a capacitor (or a load having an unignorable level of certain reactance component), the load voltage is likely to deviate from a target voltage, due to, for example, an induced electromotive force generated in the load. Particularly, when a high frequency voltage having a temporal change is output, the deviation becomes larger. Moreover, due to influence of load fluctuation, residual potential, etc., the load voltage is likely to deviate from a target value of the output voltage.

The above electric energy storage apparatus makes it possible to detect an actual load voltage different from the target value, by the load voltage detection means, and connect the load to any one of the electric energy storage modules to directly adjust the load voltage by means of charging and discharging. In addition, excess energy in the load can be regeneratively returned to the electric energy storage module so as to compensate for a voltage drop in each of the electric energy storage modules to some extent, which leads to stabilization in operation.

In addition, according to an aspect of the present invention, there is provided a method of outputting a voltage using the electric energy storage apparatus described above. The method comprises the steps of: inputting a reference waveform signal from reference waveform outputting means; based on the reference waveform signal, determining a voltage magnitude and polarity in a target output voltage waveform at a certain clock time; based on the electric energy storage module voltage, and the voltage magnitude in the target output voltage waveform at the certain clock time, turning on one of the switches comprised in the switch group; and, based on the voltage polarity in the target output voltage waveform at the certain clock time, selectively connecting each of the first connection point and the second connection point to one of the output terminals, in the positive-negative inversion circuit, wherein a magnitude and polarity of the output voltage are selected at intervals of a predetermined period of time to adjust the output voltage to conform to the target output voltage waveform.

The aspect of the present invention provides a specific process for outputting a voltage having a desired waveform pattern using the electric energy storage apparatus of the present invention.

The above method may comprise a step of performing a switchover among at least two states selected from the group consisting of a state in which all of the switches in the switch group are turned off and all of states in which any one of the switches in the switch group is turned on, once or more within the predetermined period of time, to adjust a temporal average value of the output voltage within the predetermined period of time.

In the method described above, when a temporally-changing voltage is output, for example, through a switch changeover at intervals of a predetermined period of time, the switch changeover can be performed in a plurality of states for providing different output voltages within the predetermined period of time to further finely adjust a substantial (temporal average) voltage within the predetermined period of time. As one example, a changeover between a state in which all of the switches is turned off and a state in which an integer number of series-connected electric energy storage modules contribute to the output can be performed at high speed to obtain an output voltage corresponding to a voltage across a half of the integer number of series-connected electric energy storage modules. This makes it possible to adjust the output voltage in a multi-step manner by pulse width modulation (PWM) control, even if the electric energy storage apparatus comprises a small number of electric energy storage modules.

In addition, according to an aspect of the present invention, there is provided an electric energy storage apparatus which comprises: an electric energy storage module group formed by connecting in series two or more electric energy storage modules each comprising one or more electric energy storage elements; a balancing circuit electrically connected to the electric energy storage module group and configured to adjust a voltage to be applied to each of the electric energy storage modules; a first switch group comprising two or more switches each provided in a path connecting a first terminal and a terminal of one of the series-connected electric energy storage modules; and a second switch group comprising two or more switches each provided in a path connecting a second terminal and a terminal of one of the series-connected electric energy storage modules, wherein the electric energy storage apparatus is configured to perform a switch changeover in the first and second switch groups so as to select a magnitude and polarity of an output voltage depending on a configuration of the electric energy storage elements present in a path connecting the first and second terminals.

The electric energy storage apparatus described above makes it possible to select the magnitude and polarity of the output voltage by the switch changeover in the first and second switch groups, without using a positive-negative inversion circuit. Typically, the polarity can be selected by switching from which of the first and second switch groups a switch on the higher potential side is selected and from which of the first and second switch groups a switch on the lower potential side is selected.

In addition, according to an aspect of the present invention, there is provided an electric energy storage apparatus which comprises: an electric energy storage module group formed by connecting in series two or more electric energy storage modules each comprising one or more electric energy storage elements, wherein each of the electric energy storage modules is connected to a constant-voltage DC power supply; a first switch group comprising two or more switches each provided in a path connecting a first terminal and a terminal of one of the series-connected electric energy storage modules; a second switch group comprising two or more switches each provided in a path connecting a second terminal and a terminal of one of the series-connected electric energy storage modules, wherein the electric energy storage apparatus is configured to perform a switch changeover in the first and second switch groups so as to select a magnitude and a polarity of an output voltage depending on a configuration of the electric energy storage elements present in a path connecting the first and second terminals.

The above electric energy storage apparatus is configured such that a constant-voltage DC power supply is connected to each of the electric energy storage modules, instead of using the balancing circuit.

The electric energy storage apparatus according to an aspect of the present invention may further comprise: voltage detection means configured to detect a voltage across the electric energy storage module; and first switch-group control means configured to, based on the electric energy storage module voltage detected by the voltage detection means, and a voltage in a target output voltage waveform at a certain clock time, turn on one of the switches comprised in a respective one of the first and second switch groups, wherein the electric energy storage apparatus is configured to, depending on a magnitude and polarity of the target output voltage waveform, and the electric energy storage module voltage, control the first and second switch groups to output a voltage having the target output voltage waveform.

Alternatively, the electric energy storage apparatus according to an aspect of the present invention may further comprise: voltage detection means configured to detect a voltage across a load connected to the electric energy storage apparatus; and first switch-group control means configured to, based on the load voltage detected by the voltage detection means, and a voltage in a target output voltage waveform at a certain clock time, turn on one of the switches comprised in a respective one of the first and second switch groups, wherein the electric energy storage apparatus is configured to, depending on a magnitude and polarity of the target output voltage waveform, and the load voltage, control the first and second switch groups to output a voltage having the target output voltage waveform.

As above, the electric energy storage apparatus may be configured to directly detect the load voltage, instead of the electric energy storage module voltage, and adjust the output voltage based on the detected load voltage.

The electric energy storage apparatus according to the fifth or sixth aspect of the present invention may further comprise: load voltage detection means configured to detect a voltage across a load connected to the electric energy storage apparatus; and second switch-group control means configured to, based on a voltage in the target output voltage waveform at a certain clock time, and a load voltage detected at the certain clock time by the load voltage detection means, turn on one of the switches comprised in a respective one of the first and second switch groups, wherein the electric energy storage apparatus is configured to adjust the load voltage to conform to the voltage in the target output voltage waveform at the certain clock time, by charging and discharging between the load and the electric energy storage module connected to the load through the switches turned on by the second switch-group control means.

The above electric energy storage apparatus makes it possible to correct a load voltage deviation due to a reactance component in the load, and regeneratively return excess energy to the electric energy storage module so as to compensate for a voltage drop in each of the electric energy storage modules.

In addition, according to an aspect of the present invention, there is provided a method of outputting a voltage using the electric energy storage apparatus according to the fifth or sixth aspect of the present invention. The method comprises the steps of: inputting a reference waveform signal from reference waveform outputting means; based on the reference waveform signal, determining a voltage magnitude and polarity in a target output voltage waveform at a certain clock time; and based on the electric energy storage module voltage, and the voltage magnitude and polarity in the target output voltage waveform at the certain clock time, turning on one of the switches comprised in a respective one of the first and second switch groups, wherein a magnitude and polarity of the output voltage are selected at intervals of a predetermined period of time to adjust the output voltage to conform to the target output voltage waveform.

The method described above provides a specific process for outputting a voltage having a desired waveform pattern using the electric energy storage apparatus of the present invention.

The method described above may comprises a step of performing a switchover among at least two states selected from the group consisting of a state in which all of the switches in the first or second switch group are turned off and all of states in which any one of the switches in a respective one of the first and second switch groups is turned on, once or more within the predetermined period of time to adjust a temporal average value of the output voltage within the predetermined period of time.

This makes it possible to adjust the output voltage in a multi-step manner by pulse width modulation control.

In the present invention, a capacitor or a secondary battery may be used as the electric energy storage element. However, the electric energy storage apparatus of the present invention may be constructed using any other element, module, device, or the like.

DETAILED DESCRIPTION

Figure 1:
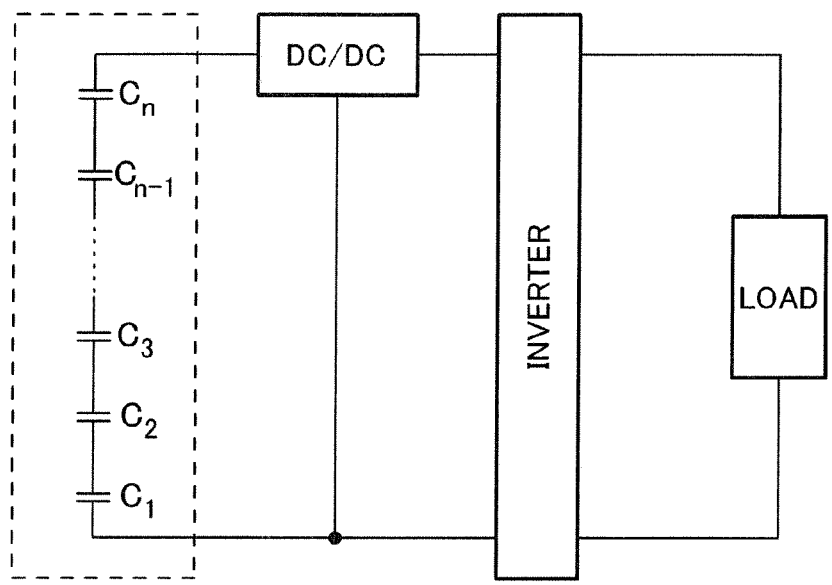
FIG. 1 is a circuit diagram illustrating a conventional AC electric energy storage apparatus using electric energy storage means.

In one aspect, particularly in cases where a capacitor having an output characteristic greatly varying depending on a charged/discharged state thereof is used as the electric energy storage means, it is necessary to operate the DC-DC converter in a wide input voltage range so as to convert the varying output voltage to a voltage falling within a certain operating range. In this case, the operation of the DC-DC converter in a wide input voltage range causes a problem of an increase in loss. Moreover, when the DC-DC converter is a conventional type using a transformer and a coil, there are other problems, such as a problem that a circuit size becomes relatively large due to the coil, and a problem that a weight of the transformer as a whole is increased due to its components such as an iron core.

An output voltage of the DC-DC converter is subjected to switching by the inverter, so as to allow the above electric energy storage apparatus to generate an AC output. In this process, when a high voltage is output from the DC-DC converter, switching of the high voltage causes a problem of an increase in noise.

Therefore, if an electric energy storage apparatus is provided which is capable of generating an AC output while minimizing the use of a DC-DC converter and an inverter, it leads to an improvement in efficiency, a reduction in noise and a reduction in size of the apparatus as a whole.

The electric energy storage apparatus of the present invention is capable of outputting a DC/AC voltage having a target waveform without using a module such as a DC-DC converter. In an electric energy storage apparatus according to a specific embodiment of the present invention, an inverter also becomes unnecessary.

This makes it possible to realize an electric energy storage apparatus capable of outputting a DC/AC voltage in a low-loss and low-noise manner over a wide output intensity range.

Further, it becomes possible to regeneratively return energy backflow from the load due to load fluctuation, residual potential, electromagnetic induction, etc., to the electric energy storage module, to achieve more accurate load voltage control, and higher efficiency in energy consumption With reference to the drawings, an electric energy storage apparatus and a voltage outputting method according to the present invention will now be described. It is to be understood that a configuration of an electric energy storage apparatus according to the present invention is not limited to specific configurations of the following embodiments illustrated in the figures, but various changes and modifications may be appropriately made therein without departing from the spirit and scope thereof as set forth in appended claims. For example, the following embodiments will be described on the assumption that each of one or more electric energy storage elements is primarily a capacitor. Alternatively, the electric energy storage element may be any chargeable and dischargeable element such as a secondary battery, or a module composed of a plurality of chargeable and dischargeable elements. Each of the electric energy storage elements may have a different capacitance. Further, the following embodiments will be described on the assumption that each of a plurality of switches is a semiconductor switch such as MOSFET. Alternatively, any electronic or mechanical switch may be used.

FIRST EXAMPLE:

Configuration of Electric Energy Storage Apparatus 1

Figure 2:
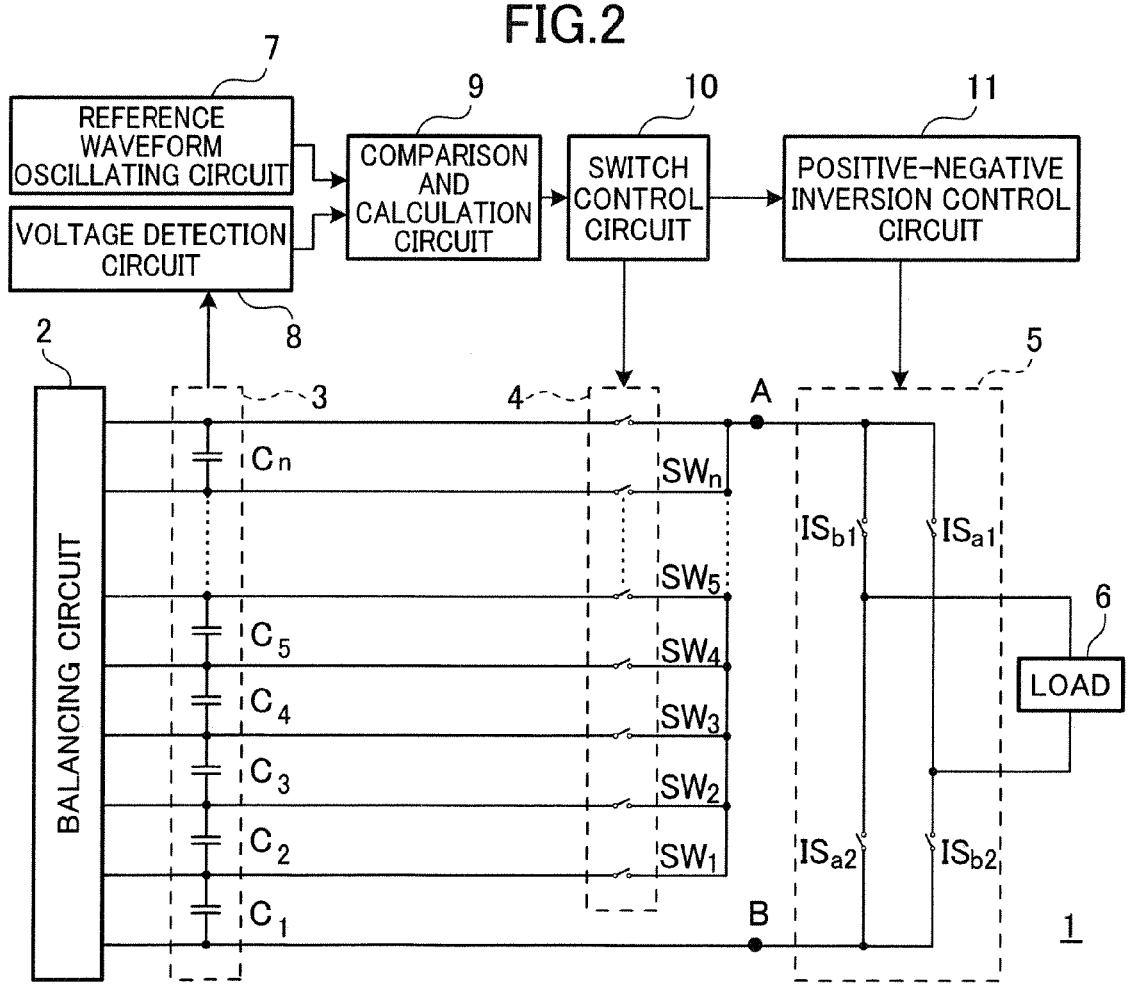
FIG. 2 is a circuit diagram illustrating an AC output-capable electric energy storage apparatus according to a first embodiment of the present invention.

FIG. 2 is a circuit diagram illustrating an AC output-capable electric energy storage apparatus 1 according to a first embodiment of the present invention. The electric energy storage apparatus 1 comprises: a balancing circuit 2; an electric energy storage module group 3 composed of n electric energy storage modules (hereinafter referred to as "capacitors") $C_1$ to $C_n$ connected in series; a switch group 4 composed of n switches $SW_1$ to $SW_n$; and a positive-negative inversion circuit 5 including switches $IS_{a1}$, $IS_{a2}$, $IS_{b1}$, $IS_{b2}$, wherein the electric energy storage apparatus 1 is configured to apply a voltage to a load 6 in a desired magnitude and polarity. The load 6 is not limited to a resistor, but may be any load, such as an element, module or device adapted to be operated by electric power. In the figure, each of the reference codes A, B indicates a connection point serving as an input section of the positive-negative inversion circuit 5.

Figure 3:
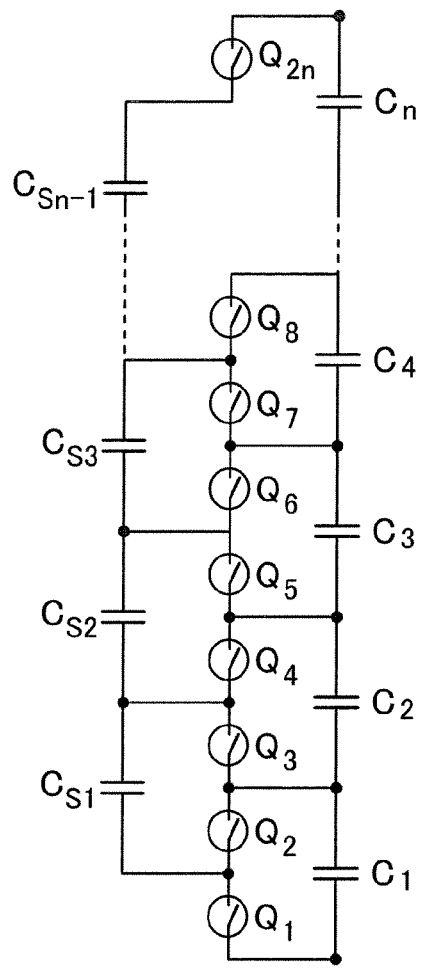
FIG. 3 is a circuit diagram illustrating a switched capacitor usable as one example of a balancing circuit.

The balancing circuit 2 may be a circuit comprising an electric energy storage cell module disclosed, for example, in the Patent Document 1, or may be a circuit configured as a switched capacitor system comprising capacitors $C_{S1}$ to $C_{Sn-1}$ and switches Q1 to $Q_{2n}$, as illustrated in FIG. 3.

In cases where the switched capacitor system in FIG. 3 is used as the balancing circuit 2, the capacitors $C_{S1}$ to $C_{Sn-1}$, $C_1$ to $C_n$ are subjected to mutual charging and discharging by means of high-speed changeover of the switches $Q_1$ to $Q_{2n}$, so that respective voltages dividedly borne by the capacitors are equalized.

Specifically, when each of the odd-numbered switches $Q_1$, $Q_3, \ldots, Q_{2n-1}$ is in ON state, capacitors ($C_1$ and $C_{S1}$; $C_2$ and $C_{S2}$; ---; $C_{Sn-1}$) are connected in parallel, respectively. Thus, if a variation in voltage occurs between the parallel-connected capacitors, mutual charging and discharging are performed, so that the voltage variation will move toward being eliminated. On the other hand, when each of the even-numbered switches $Q_2, Q_4, ---, Q_{2n}$ is in an ON state, capacitors ($C_2$ and $C_{S1}$; $C_3$ and $C_{S2}$; ...; $C_n$ and $C_{Sn-1}$) are connected in parallel, respectively. Thus, if a variation in voltage occurs between the parallel-connected capacitors, mutual charging and discharging are performed, so that the voltage variation will move toward being eliminated.

Thus, based on repeatedly performing switching between a mode where all of the odd-numbered switches are turned on and another mode where all of the even-numbered switches are turned on, each of the capacitors is subjected to mutual charging and discharging with respect to all of the remaining capacitors directly or indirectly (through other capacitors), so that voltages across the capacitors $C_{S1}$ to $C_{Sn-1}$, $C_1$ to $C_n$ are equalized.

However, it is not essential for the electric energy storage apparatus 1 of the present invention to equalize voltages across the capacitors $C_1$ to $C_n$ by the balancing circuit 2.

Specifically, a magnitude of the output voltage from the electric energy storage apparatus 1 can be adjusted in increments of a voltage across each of the capacitors $C_1$ to $C_n$, as described in detail later. In this case, it is not essential that voltages across such electric energy storage elements each serving as a unit for the adjustment are equal to each other. For example, the balancing circuit 2 may be configured to apply two types of magnitudes of voltages to the capacitors so as to allow the output voltage to be adjusted in two types of increments. Alternatively, all of the capacitor voltages may be adjusted to different values, respectively.

As each of the electric energy storage modules $C_1$ to $C_n$ making up the electric energy storage module group 3, it is possible to use an electric energy storage module composed of two or more capacitors or secondary batteries (or any other electric energy storage elements), instead of using a single capacitor. Even in cases where two or more capacitors or secondary batteries are connected in series or in parallel, it can be handled as with a capacitor by appropriately calculating a composite capacitance thereof.

Each of the switches $SW_1$ to $SW_n$ comprised in the switch group 4 is disposed in a path connecting a terminal of one of the capacitors $C_1$ to $C_n$ and the connection point A within the electric energy storage apparatus 1. When one of the switches $SW_1$ to $SW_n$ is turned on, a terminal of the selected switch is electrically connected to the connection point A, so that, depending on the selected switch, a voltage obtained by summing voltages across one or more of the capacitors $C_1$ to $C_n$ is applied between the connection point A and the connection point B.

The positive-negative inversion circuit 5 is configured to perform changeover among the switches $IS_{a1}$, $IS_{a2}$, $IS_{b1}$, $IS_{b2}$ to select an output terminal of the electric energy storage apparatus 1 to be connected to the connection points A, B. Specifically, a polarity of a voltage to be applied to the load 6 can be selected depending on whether the switches $IS_{a1}$, $IS_{a2}$ are turned on, or switches $IS_{b1}$, $IS_{b2}$ are turned on. It is to be noted that the above configuration using four switches is simply described as one example of the positive-negative inversion circuit 5, and any other suitable circuit capable of selecting a polarity of the output voltage may be used to implement the electric energy storage apparatus 1 of the present invention.

The electric energy storage apparatus 1 in FIG. 2 further comprises a reference waveform oscillating circuit 7, a voltage detection circuit 8, a comparison and calculation circuit 9, a switch control circuit 10, and a positive-negative inversion control circuit 11.

The reference waveform oscillating circuit 7 is configured to output a reference waveform signal representing a target output voltage waveform which is a voltage to be output from the electric energy storage apparatus 1. Typically, the electric energy storage apparatus 1 operates to output a voltage obtained by multiplying an instantaneous voltage in the reference waveform signal output from the reference waveform oscillating circuit 7, by a certain magnification value.

The voltage detection circuit 8 is configured to detect a voltage across at least one of the capacitors $C_1$ to $C_n$, or voltages across all of the respective capacitors $C_1$ to $C_n$. Typically, the voltage detection circuit 8 is configured such that it is connected to the capacitors $C_1$ to $C_n$ to directly detect voltages across the respective capacitors $C_1$ to $C_n$ and output the detected voltages to the comparison and calculation circuit 9. Alternatively, for example, the voltage detection circuit 8 may be configured such that it is connected to an arbitrary element in the balancing circuit to detect a voltage across the element, and then a voltage across each of the capacitors is calculated based on a value of the detected voltage.

The voltage detection circuit 8 may be configured to directly detect a voltage across the load 6, instead of the capacitor voltage, as previously described. This is because a specific mathematical relationship is established between the electric energy storage module voltage and the load voltage, depending on one of the switches to be selectively turned on, and thereby it is only necessary to detect one of them so as to adjust an output voltage. Although not illustrated, in such a case, the voltage detection circuit 8 is connected to the load 6, instead of the electric energy storage module group 3.

The comparison and calculation circuit 9 is configured to compare a target voltage determined based on a voltage of the reference waveform signal output from the reference waveform oscillating circuit 7 (typically, the target voltage is determined as a voltage having a polarity and a magnitude obtained by multiplying the voltage of the reference waveform signal by a certain magnification value), with a capacitor voltage output from the voltage detection circuit 8, and output a signal to the switch control circuit 10.

For example, the signal may be a signal simply indicative of a ratio between the target voltage and the capacitor voltage. Alternatively, the specific signal may be a signal for informing of a deviation between the target voltage and an output voltage, wherein the comparison and calculation circuit 9 is operable to: receive information about a present switch changeover state from the switch control circuit 10, while receiving a value of the capacitor voltage from the voltage detection circuit 8; calculate a magnitude of a voltage presently output from the electric energy storage apparatus 1, based on the received switch changeover state and the received capacitor voltage value; and calculate the deviation between the target voltage and the output voltage. Alternatively, the comparison and calculation circuit 9 may be configured to determine a switch changeover state to be selected, based on the above information, and output a changeover instruction signal to the switch control circuit 10.

The switch control circuit 10 is configured to, based on a signal received from the comparison and calculation circuit 9, output a switch changeover signal to the switch group 4.

In cases where a semiconductor switch, such as MOSFET, is used as each of the switches $SW_1$ to $SW_n$, the switch changeover signal may be an RF signal to be generated, for example, by an RF oscillation circuit in the switch control circuit 10. In cases where a mechanical switch is used as each of the switches $SW_1$ to $SW_n$, for example, the switch control circuit 10 may be appropriately configured to generate a suitable control signal depending on a specific operating principle of the switch.

The positive-negative inversion control circuit 11 is configured to send a control signal to the positive-negative inversion circuit 5 so as to change a polarity of an output voltage according to need. In cases where the switch-based configuration illustrated in FIG. 2 is used as the positive-negative inversion circuit 5, the positive-negative inversion control circuit 11 may be any switch driver as with the switch control circuit. However, the positive-negative inversion control circuit 11 is not limited thereto, but any other suitable circuit capable of controlling the operation of the positive-negative inversion circuit 5 may be used depending on a specific configuration of the positive-negative inversion circuit 5. The signal for informing of a polarity of a voltage to be output may be input from the comparison and calculation circuit 9 into the positive-negative inversion control circuit 11 via the switch control circuit 10, or may be input from the comparison and calculation circuit 9 directly into the positive-negative inversion control circuit 11.

In the operation of the electric energy storage apparatus according to the present invention, the group of circuits 7 to 11 can be advantageously used to automatically perform control during the operation. However, the circuit group is not essential, but the electric energy storage apparatus 1 according to the present invention may be operated under connection with any suitable external device or under control of any suitable external system.

In FIG. 2, the reference waveform oscillating circuit 7, the voltage detection circuit 8, the comparison and calculation circuit 9, the switch control circuit 10 and the positive-negative inversion control circuit 11 are illustrated as independent circuits, respectively. Alternatively, the circuits may be replaced with a single circuit incorporating all functions thereof. Alternatively, a function of each of the circuits may be borne by two or more arbitrary number of circuits.

Operation of Electric Energy Storage Apparatus 1

The operation of the electric energy storage apparatus 1 will be described below. In an initial state, the capacitors $C_1$ to $C_n$ are charged at predetermined voltages, respectively. The voltages may be different from each other, as discussed above. As one example, the following description will be made on the assumption that the same voltage is applied to all of the capacitors. Further, assuming that each of the switches $SW_1$ to $SW_n$ is in an OFF state, and an arbitrary changeover state is selected in the positive-negative inversion circuit 5.

The comparison and calculation circuit 9 is in a standby state capable of receiving an input of respective signals from the reference waveform oscillating circuit 7 and the voltage detection circuit 8. As one example, the comparison and calculation circuit 9 is operable to ascertain respective signals from the reference waveform oscillating circuit 7 and the voltage detection circuit 8 at intervals of a predetermined period of time determined, for example, by a clock frequency of a processing unit (not illustrated) constituting the comparison and calculation circuit 9, and, when both of the signals are present, to execute comparison and calculation.

Upon input of signals from the reference waveform oscillating circuit 7 and the voltage detection circuit 8 into the comparison and calculation circuit 9, the comparison and calculation circuit 9 compares an instantaneous voltage value of the reference waveform signal input from the reference waveform oscillating circuit 7, with a capacitor voltage input from the voltage detection circuit 8.

For example, assuming that the instantaneous voltage value of the reference waveform signal is +50 mV, and the voltage across each of the capacitors $C_1$ to $C_n$ is 1V. As a preset magnification value of the electric energy storage apparatus 1, a preliminary setting may be made in which an output is 100 times the reference waveform (typically, based on a setting signal to be input into the comparison and calculation circuit 9 from the reference waveform oscillating circuit 7 or through any suitable external interface). In this case, the comparison and calculation circuit 9 compares the capacitor voltage 1V, with 5V which is 100 times the instantaneous voltage value of the reference waveform signal, and outputs, to the switch control circuit 10, a signal indicative of "5" which is a ratio therebetween and a signal indicative of "+" which is a polarity of the voltage of the reference waveform signal (or directly outputs a signal indicative of "+5V" which is a target output voltage).

The switch control circuit 10 selects a changeover state of the switch group 4 to be selected, according to the signals input thereinto. When a signal indicative of "5" as a ratio is input, it is necessary to select a voltage corresponding to five capacitors, as a magnitude of a target output voltage. Thus, the switch control circuit 10 outputs, to the switch group 4, a switch changeover signal for turning on the switch $SW_5$. (Alternatively, the switch control circuit 10 may be configured to, based on a signal indicative of "+5V" as a target output voltage received from the comparison and calculation circuit 9, and a capacitor voltage received from the voltage detection circuit 8, make a determination that the switch $SW_5$ should be turned on, and then output a switch changeover signal for turning on the switch $SW_5$.)

When the switch $SW_5$ is turned on by the switch changeover signal, a 5V voltage which is a sum of voltages across the respective capacitors $C_1$ to $C_5$ is applied between the connection points A, B.

After being output from the comparison and calculation circuit 9, the signal indicative of "+" which is a polarity of the instantaneous voltage value of the reference waveform signal, i.e., a polarity of the target output voltage, is input into the positive-negative inversion control circuit 11 through the switch control circuit 10 (or directly). The positive-negative inversion control circuit 11 is preliminarily set such that the switch $IS_{a1}$ and the switch $IS_{a2}$ correspond to the "+" signal, and the switch $IS_{b1}$ and the switch $IS_{b2}$ correspond to a "−" signal (or to a converse correspondence relationship). Thus, when the positive-negative inversion control circuit 11 receives the "+" signal, it outputs, to the positive-negative inversion circuit 5, a control signal for turning on the switches $IS_{a1}$, $IS_{a2}$.

When the switches $IS_{a1}$, $IS_{a2}$ in the positive-negative inversion circuit 5 are turned on by the control signal, the "+5V" voltage, i.e., target output voltage, is applied to the load 6.

The operation of adjusting the output voltage according to an instantaneous voltage value of the reference waveform signal at a certain clock time is performed in the above manner. According to the above adjustment operation, the output voltage is adjusted at intervals of a predetermined period of time, based primarily on a clock frequency determined by the comparison and calculation circuit 9, depending on momentarily varying instantaneous values of the target output voltage. The electric energy storage apparatus 1 is capable of selectively outputting a DC voltage and an AC voltage depending on reference waveform signals.

Not only based on the instantaneous value of the target output voltage but also when the capacitor voltage is lowered due to discharge of the capacitors $C_1$ to $C_5$, the switch changeover is adequately performed according to the above operation.

For example, assuming that a signal input from the reference waveform oscillating circuit 7 into the comparison and calculation circuit 9 indicates "+50 mV", i.e., the same instantaneous voltage value of the reference waveform signal as before. On the other hand, assuming that a signal input from the voltage detection circuit 8 indicates a voltage across each of the capacitors $C_1$ to $C_n$ is 0.5V (which corresponds to a phenomenon that a voltage drop occurs in each of the capacitors $C_1$ to $C_n$ due to discharge caused by continuous voltage application to the load 6. Even if only the capacitors $C_1$ to $C_5$ are directly connected to the load 6, a voltage drop equally occurs in the capacitors $C_1$ to $C_n$ by the operation of the balancing circuit 2).

The comparison and calculation circuit 9 compares the capacitor voltage 0.5V, with 5V which is 100 times the instantaneous voltage value of the reference waveform signal, and outputs, to the switch control circuit 10, a signal indicative of "10" which is a ratio therebetween and a signal indicative of "+" which is a polarity of the target voltage.

The switch control circuit 10 selects a changeover state of the switch group 4, according to the signals input thereinto. When a signal indicative of "10" as a ratio is input, it is necessary to select a voltage corresponding to ten capacitors, as a magnitude of a target output voltage. Thus, the switch control circuit 10 outputs, to the switch group 4, a switch changeover signal for turning on the switch $SW_{10}$ (not illustrated).

When the switch $SW_{10}$ is turned on by the switch changeover signal, a 5V voltage which is a sum of voltages across the respective capacitors $C_1$ to $C_{10}$ (not illustrated) is applied between the connection points A, B.

After being output from the comparison and calculation circuit 9, the signal indicative of "+" which is a polarity of the target output voltage, is input into the positive-negative inversion control circuit 11 through the switch control circuit 10 (or directly). Thus, when the positive-negative inversion control circuit 11 receives the "+" signal, it outputs, to the positive-negative inversion circuit 5, a control signal for turning on the switches $IS_{a1}$, $IS_{a2}$.

When the switches $IS_{a1}$, $IS_{a2}$ in the positive-negative inversion circuit 5 are turned on by the control signal (if such a state has already been selected, the switch changeover is unnecessary), the "+5V" voltage is applied to the load 6.

As above, based on continuously monitoring a capacitor voltage by the voltage detection circuit 8, it becomes possible to prevent a disturbance of the output voltage due to a voltage drop in the capacitors.

Figure 4:
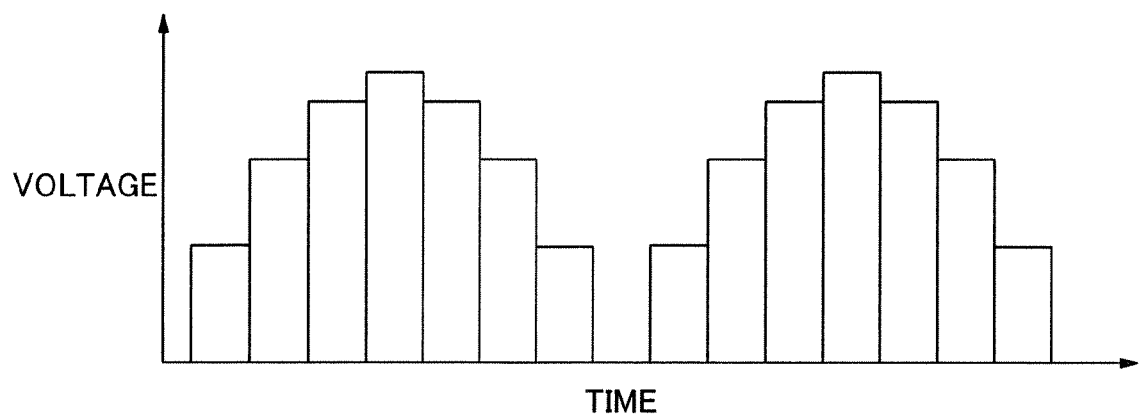
FIG. 4 is a graph illustrating one example of a voltage waveform to be input into a positive-negative inversion circuit via connection points A, B, in the electric energy storage apparatus in FIG. 2.

FIG. 4 is a graph illustrating one cycle of a voltage which is output between the connection points A, B when a sine wave is input as the target output voltage. During one cycle, an actual sine wave is changed between a positive polarity and a negative polarity. However, the polarity change is not reflected on changeover among the switch group 4, and a voltage having the same polarity is output between the connection points A, B. This voltage is input into the positive-negative inversion circuit, and subjected to conversion corresponding to the polarity of the target output voltage at each clock time.

In the graph illustrated in FIG. 4, the output voltage to the connection points A, B changes in a stepwise manner at constant time intervals, instead of changing in a continuous manner. This is because the electric energy storage apparatus 1 is configured to adjust the output voltage at intervals of a predetermined period of time, as previously discussed.

In the example illustrated in FIG. 4, the adjustment of the output voltage is performed 16 times during one cycle of the reference waveform signal. It is to be understood that the predetermined period of time may be shortened to obtain a smoother output voltage waveform.

Figure 5:
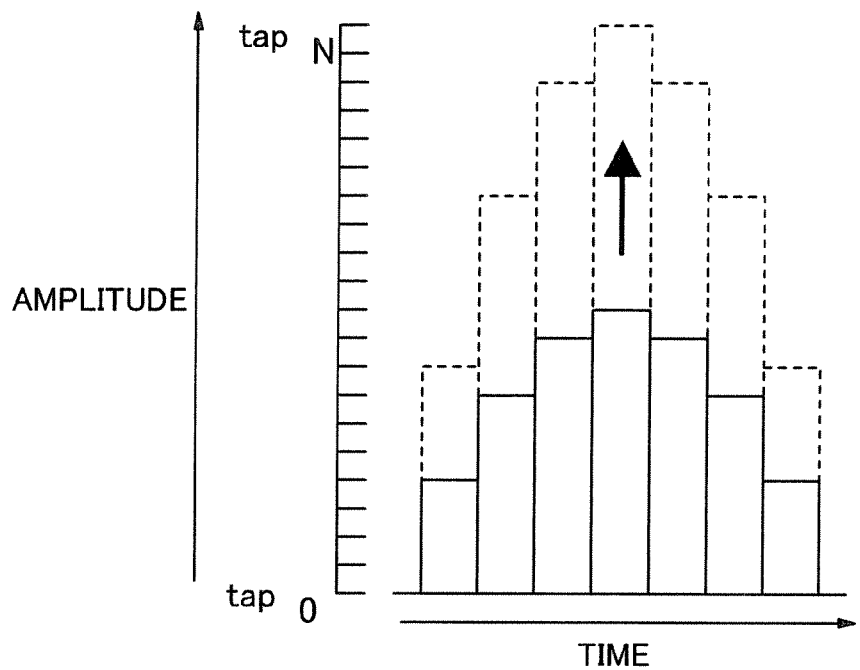
FIG. 5 is a diagram illustrating a switch changeover to be performed to compensate for an influence of voltage drop in electric energy storage modules.

FIG. 5 is a diagram illustrating a switch changeover to be performed to compensate for an influence of voltage drop in the capacitors. When a voltage is continuously applied to the load 6, each of the capacitors $C_1$ to $C_n$ is discharged, and a voltage across each of the capacitors $C_1$ to $C_n$ is lowered, as previously discussed. Therefore, even if a sine wave having a constant amplitude characteristic is input as the reference waveform signal, the number of capacitors required for outputting a voltage having a magnitude corresponding to the constant amplitude characteristic will be increased over time.

The graph drawn by the solid line in FIG. 5 indicates a temporal change in a selected one of the switches to output a sine wave corresponding to the reference waveform signal over a certain half cycle. On the other hand, the broken line in FIG. 5 indicates a temporal change in a selected one of the switches to output a sine wave corresponding to the reference waveform signal over another half cycle temporally subsequent to the certain half cycle. FIG. 5 shows that the number of capacitors contributing to an output has to be increased over time to output a voltage value in a sine wave having the same amplitude characteristic and in the same phase characteristic (assuming here that a cycle of the sine wave is sufficiently shorter than a discharge time of the capacitor. If such conditions cannot be established, the graph in FIG. 5 is corrected to a curve extending rightwardly and upwardly over time even in the same half cycle.)

In cases where certain charging means is incorporated in the balancing circuit 2, or a constant-voltage DC power supply is connected to the capacitors $C_1$ to $C_n$, as described in an aftermentioned sixed embodiment, the voltage across each of the capacitors $C_1$ to $C_5$ is kept constant, so that the switch changeover for coping with the voltage drop is unnecessary.

Figure 6:
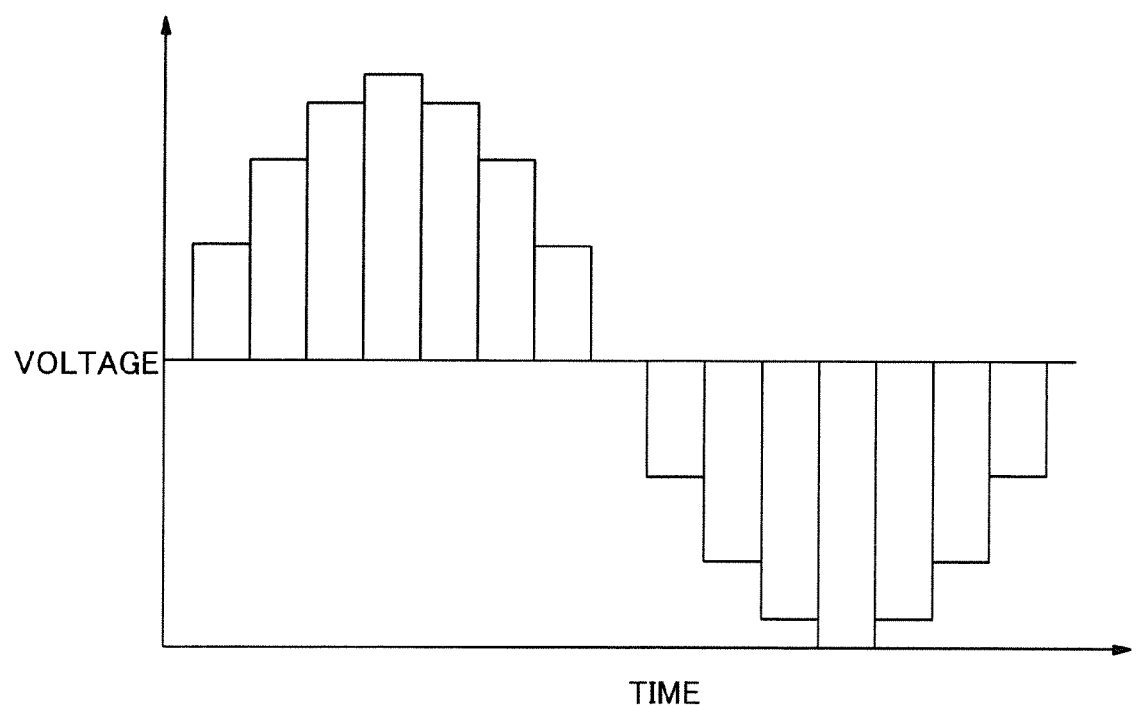
FIG. 6 is a graph illustrating one example of a voltage waveform to be applied to a load by the electric energy storage apparatus in FIG. 2.

FIG. 6 is a graph illustrating an output voltage from the electric energy storage apparatus 1 when a sine wave is input as the reference waveform signal. This voltage is applied to the load 6 as an output of the electric energy storage apparatus 1. Such the waveform corresponds to an AC voltage realized when the voltage illustrated in FIG. 4 is subjected to adequate polarity conversion in the positive-negative inversion circuit 5.

SECOND EXAMPLE

Configuration of Electric Energy Storage Apparatus 1

Figure 7:
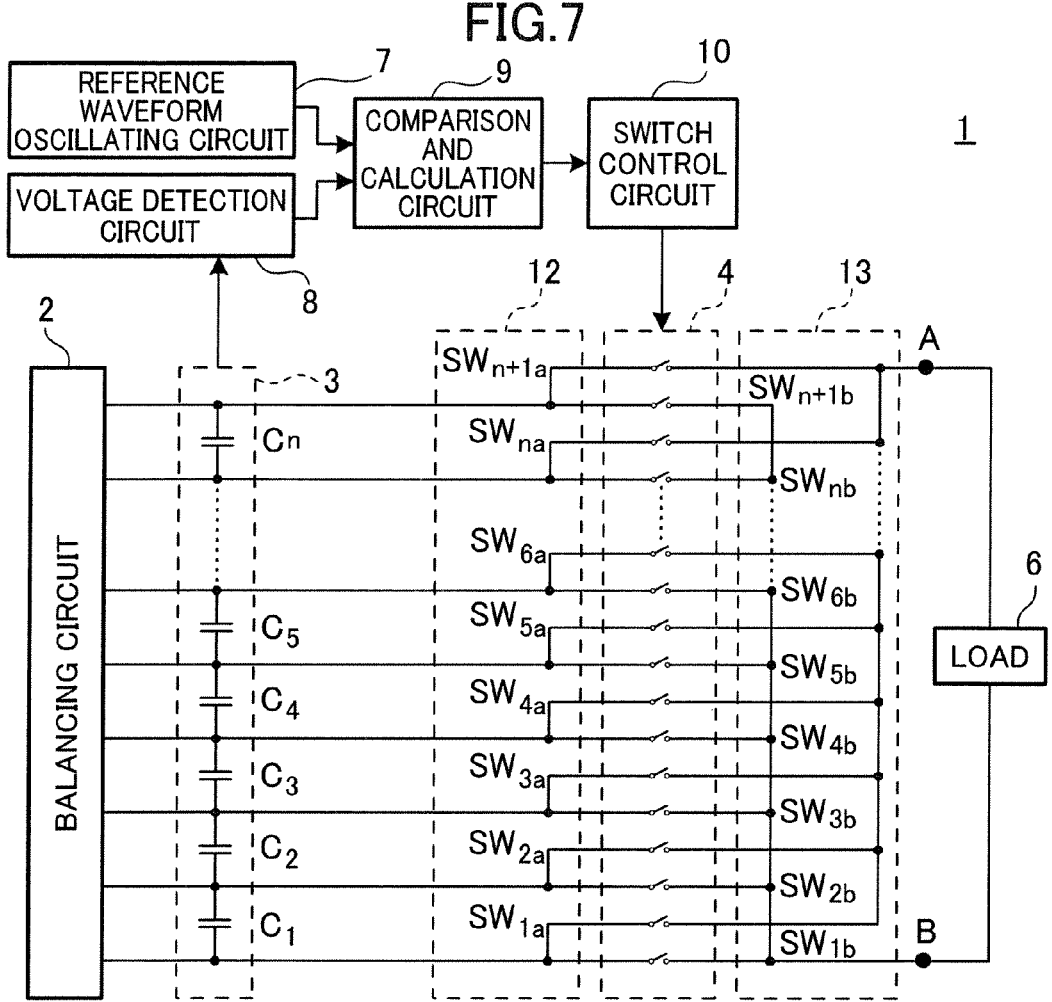
FIG. 7 is a circuit diagram illustrating an AC output-capable electric energy storage apparatus according to a second embodiment of the present invention.

FIG. 7 is a circuit diagram illustrating an AC output-capable electric energy storage apparatus 1 according to a second embodiment of the present invention. Differently from the electric energy storage apparatus in FIG. 1, the electric energy storage apparatus 1 according to the second embodiment is devoid of the positive-negative inversion circuit 5 and the positive-negative inversion control circuit 11, and the switch group 4 comprises a first switch group 12 composed of switches $SW_{1a}$ to $SW_{n+1a}$, and a second switch group 13 composed of switches $SW_{1b}$ to $SW_{n+1b}$.

Each of the switches $SW_{1a}$ to $SW_{n+1a}$ in the first switch group 12 is disposed in a path connecting a terminal of one of n capacitors $C_1$ to $C_n$ and a connection point A within the electric energy storage apparatus 1. Each of the switches $SW_{1b}$ to $SW_{n+1b}$ in the second switch group 13 is disposed in a path connecting a terminal of one of the capacitors $C_1$ to $C_n$ and a connection point B within the electric energy storage apparatus 1. The electric energy storage apparatus 1 in FIG. 7 is devoid of the positive-negative inversion circuit 5, so that a load 6 is connected between the connection points A, B. Thus, the connection points A, B will hereinafter referred to as "output terminals A, B".

The configuration illustrated in FIG. 7 is capable of changing a polarity of an output voltage without using the positive-negative inversion circuit. As one example, when each of the switch $SW_{5a}$ in the first switch group 12 and the switch $SW_{2b}$ in the second switch group 13 is in an ON state, an output voltage corresponding to a sum of voltages across the respective capacitors $C_2$, $C_3$, $C_4$ is applied to the load 6. In this state, a polarity of the output voltage can be changed by performing a switch changeover in each of the switch groups in such a manner that the switch $SW_{2a}$ in the first switch group 12 and the switch $SW_{5b}$ in the second switch group 13 are turned on.

The remaining components are the same as those in the electric energy storage apparatus illustrated in FIG. 2. Each component, circuit, element or module is not limited to the illustrated specific configuration, but various changes and modifications may be appropriately made therein without departing from the spirit and scope thereof as set forth in appended claims.

Operation of Electric Energy Storage Apparatus 1

An operation of the electric energy storage apparatus 1 configured as illustrated in FIG. 7 will be described below. In an initial state, the capacitors $C_1$ to $C_n$ are charged at predetermined voltages, respectively. The voltages may be different from each other, as discussed above. As one example, the following description will be made on the assumption that the same voltage is applied to all of the capacitors. Further, assuming that all switches in at least one of the group of switches $SW_{1a}$ to $SW_{n+1a}$ and the group of switches $SW_{1b}$ to $SW_{n+1b}$ are in an OFF state, so that no voltage is applied from the electric energy storage apparatus 1 to the load 6.

A comparison and calculation circuit 9 is in a standby state capable of receiving an input of respective signals from a reference waveform oscillating circuit 7 and a voltage detection circuit 8. As one example, the comparison and calculation circuit 9 is operable to ascertain respective signals from the reference waveform oscillating circuit 7 and the voltage detection circuit 8 at intervals of a predetermined period of time determined, for example, by a clock frequency of a processing unit (not illustrated) constituting the comparison and calculation circuit 9, and, when both of the signals are present, to execute comparison and calculation.

Upon input of signals from the reference waveform oscillating circuit 7 and the voltage detection circuit 8 into the comparison and calculation circuit 9, the comparison and calculation circuit 9 compares an instantaneous voltage value of a reference waveform signal input from the reference waveform oscillating circuit 7, with a capacitor voltage input from the voltage detection circuit 8.

For example, assuming that the instantaneous voltage value of the reference waveform signal is +50 mV, and the voltage across each of the capacitors $C_1$ to $C_n$ is 1V. As a preset magnification value of the electric energy storage apparatus 1, a preliminary setting may be made in which an output is 100 times the reference waveform (typically, based on a setting signal to be input into the comparison and calculation circuit 9 through any suitable interface). In this case, the comparison and calculation circuit 9 compares the capacitor voltage 1V, with 5V which is 100 times the instantaneous voltage value of the reference waveform signal, and outputs, to the switch control circuit 10, a signal indicative of "5" which is a ratio therebetween and a signal indicative of "+" which is a polarity of the voltage of the reference waveform signal.

The switch control circuit 10 selects a changeover state of each of the first switch group 12 and the second switch group 13, according to the signals input thereinto. When a signal indicative of "5" as a ratio is input, it is necessary to select a voltage corresponding to five capacitors, as a magnitude of a target output voltage. Thus, for example, the switch control circuit 10 outputs a signal for turning on the switch $SW_{6a}$, and a signal for turning on the switch $SW_{1b}$, to the first switch group 12 and the second switch group 13, respectively, or outputs a signal for turning on the switch $SW_{1a}$, and a signal for turning on the switch $SW_{6b}$, to the first switch group 12 and the second switch group 13, respectively.

The selection of the changeover states is determined by a polarity of the instantaneous voltage of the reference waveform signal indicated by the signal from the comparison and calculation circuit 9, i.e., a polarity of the target output voltage. As one example, a preliminary setting may be made such that, when the polarity is "+", one of the switches to be selected from the first switch group 12 has a suffix number which is equal to or greater than that of one of the switches to be selected from the second switch group 13 (typically, based on an input into the switch control circuit 10 through any suitable interface). In this case, a switch changeover signal for turning on the switch $SW_{6a}$ and a switch changeover signal for turning on the switch $SW_{1b}$ are output to the first switch group 12 and the second switch group 13, respectively.

Alternatively, a preliminary setting may be made such that, when the polarity is "+", the switch $SW_{1b}$ in the second switch group is turned on, and, when the polarity is "−", the switch $SW_{1a}$ in the first switch group is turned on. In other words, a voltage reference point is fixedly set depending on a polarity. Then, when the polarity is "+", a suitable one of the switches is selected from the first switch group, and, when the polarity is "−", a suitable one of the switches is selected from the second switch group, so that it becomes possible to adjust an output voltage according to a magnitude of the target output voltage. This configuration is capable of coping with a change in the target output voltage by performing a switch changeover in only one of the first and second switch groups at any timing, except a timing of change in polarity of the target output voltage, which makes it possible to further reduce noise due to switch changeover.

As above, based on the adequate changeover between the first switch group 12 and the second switch group 13, a "+5V" voltage which is the target output voltage is applied to the load 6.

The operation of adjusting the output voltage according to an instantaneous voltage value of the reference waveform signal at a certain clock time is performed in the above manner. According to the above adjustment operation, the output voltage is adjusted at intervals of a predetermined period of time, based primarily on a clock frequency determined by the comparison and calculation circuit 9, depending on momentarily varying instantaneous values of the target output voltage. The electric energy storage apparatus 1 is capable of selectively outputting a DC voltage and an AC voltage depending on reference waveform signals.

Not only based on the instantaneous value of the target output voltage but also when the capacitor voltage is lowered due to discharge of the capacitors $C_1$ to $C_5$, the switch changeover is adequately performed according to the above operation, as with the electric energy storage apparatus illustrated in FIG. 2.

Based on continuously monitoring a capacitor voltage by the voltage detection circuit 8, it becomes possible to prevent a disturbance of the output voltage due to a voltage drop in each capacitor, as previously discussed.

Figure 8A:
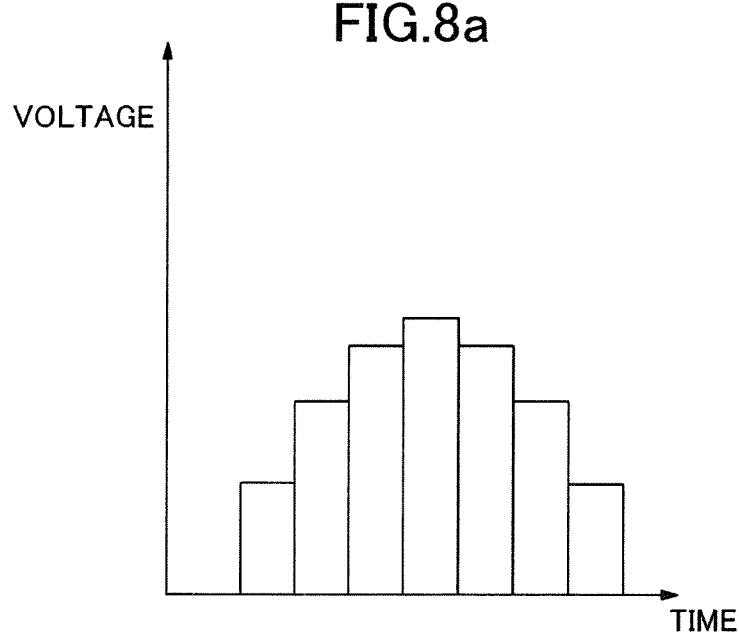
FIG. 8a is a graph illustrating one example of an output voltage waveform obtained when a switch being turned on is changed-over in $SW_{1a}$ to $SW_{n+1a}$ in a first switch group, under a condition that a switch $SW_{1b}$ in a second switch group is turned on, in the electric energy storage apparatus in FIG. 7.
Figure 8B:
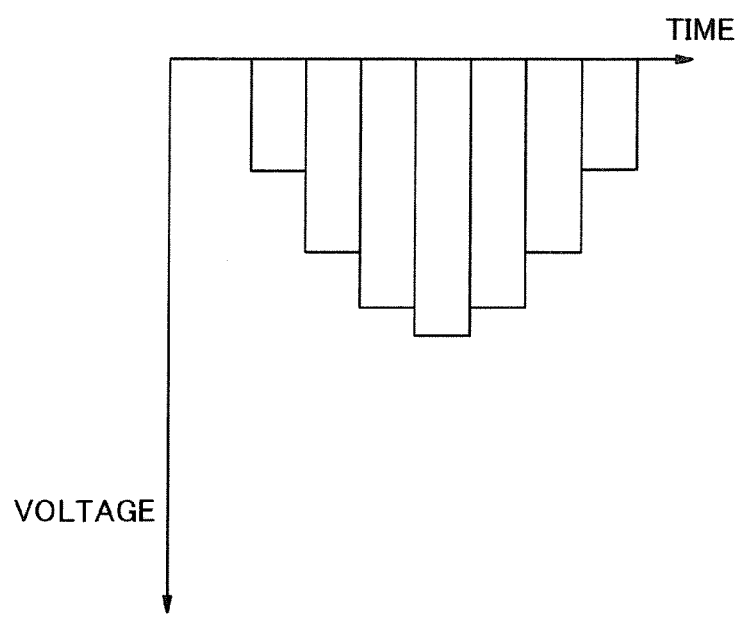
FIG. 8b is a graph illustrating one example of an output voltage waveform obtained when a switch being turned on is changed-over in $SW_{1b}$ to $SW_{n+1b}$ in the second switch group, under a condition that the switch $SW_{1a}$ in the first switch group is turned on, in the electric energy storage apparatus in FIG. 7.
Figure 9:
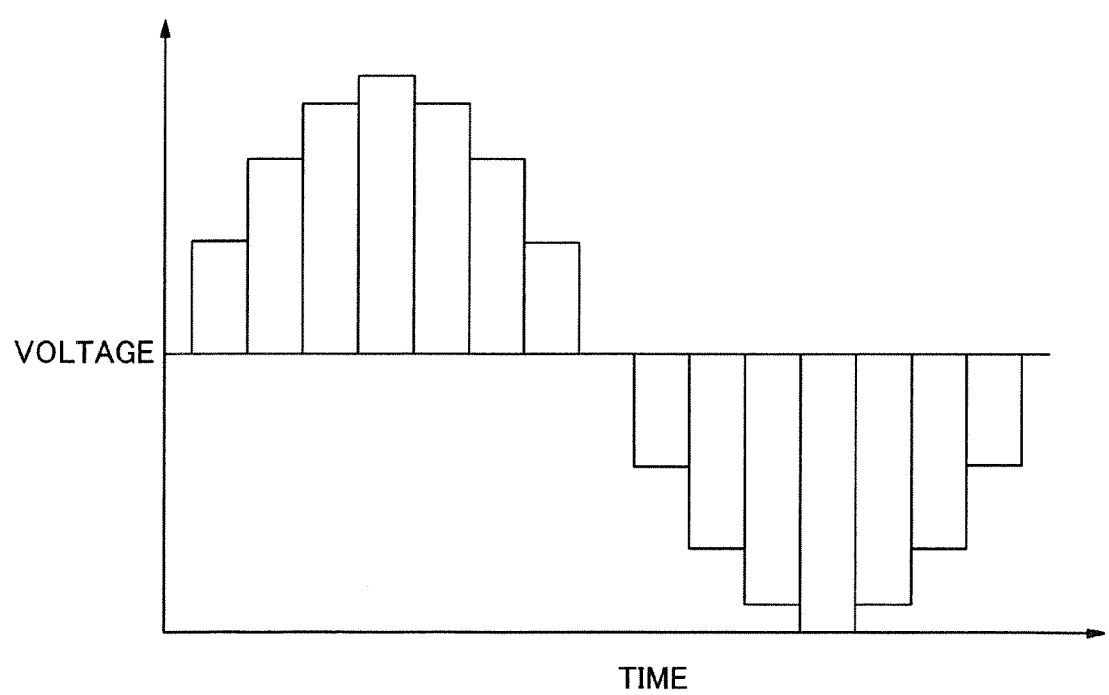
FIG. 9 is a graph illustrating one example of a voltage waveform to be applied to a load by the electric energy storage apparatus in FIG. 7.

FIGS. 8a and 8b are graphs each illustrating a half cycle of a voltage which is output between the output terminals A, B when a sine wave is input as the reference waveform signal, wherein FIG. 8a illustrates an initial half cycle, and FIG. 8b illustrates a subsequent half cycle. Specifically, FIG. 8a illustrates a voltage which is output in the initial half cycle by turning on one of the switches in the first switch group 12 in a selectively changing-over manner in conformity to a sine-waveform, under a condition that the switch $SW_{1b}$ in the second switch group 13 is turned on, and FIG. 8b illustrates a voltage which is output in the subsequent half cycle by turning on one of the switches in the second switch group 13 in a selectively changing-over manner in conformity to the sine-waveform, under a condition that the switch $SW_{1a}$ in the first switch group 12 is turned on. Based on the adequate changeover between the first switch group 12 and the second switch group 13, it becomes possible to cope with the polarity change, so that a voltage having an arbitrary waveform involving a polarity change can be output without using the positive-negative inversion circuit. FIG. 9 illustrates an AC voltage involving a polarity change, which is output over one cycle by the electric energy storage apparatus 1 illustrated in FIG. 7.

As with the first embodiment, the output voltage from the output terminals A, B changes in a stepwise manner at constant time intervals, instead of changing in a continuous manner. This is because the electric energy storage apparatus 1 is configured to adjust the output voltage at intervals of a predetermined period of time, as previously discussed. It is to be understood that the predetermined period of time may be shortened to obtain a smoother output voltage waveform.

In addition, also in the electric energy storage apparatus 1 illustrated in FIG. 7, when a voltage is continuously applied to the load 6, each of the capacitors $C_1$ to $C_n$ is discharged, and a voltage across each of the capacitors $C_1$ to $C_n$ is lowered. Therefore, even if a sine wave having a constant amplitude characteristic is input as the reference waveform signal, the number of capacitors required for outputting a voltage having a magnitude corresponding to the constant amplitude characteristic will be increased over time. Thus, it is preferable to perform the switch changeover as illustrated in FIG. 5 in the same manner as that in the first embodiment.

In cases where certain charging means is incorporated in the balancing circuit 2, or a constant-voltage DC power supply is connected to the capacitors $C_1$ to $C_n$, as described in the aftermentioned sixed embodiment, the voltage across each of the capacitors $C_1$ to $C_5$ is kept constant, so that the switch changeover for coping with the voltage drop is unnecessary.

THIRD EXAMPLE

Configuration of Electric Energy Storage Apparatus 1

Figure 12:
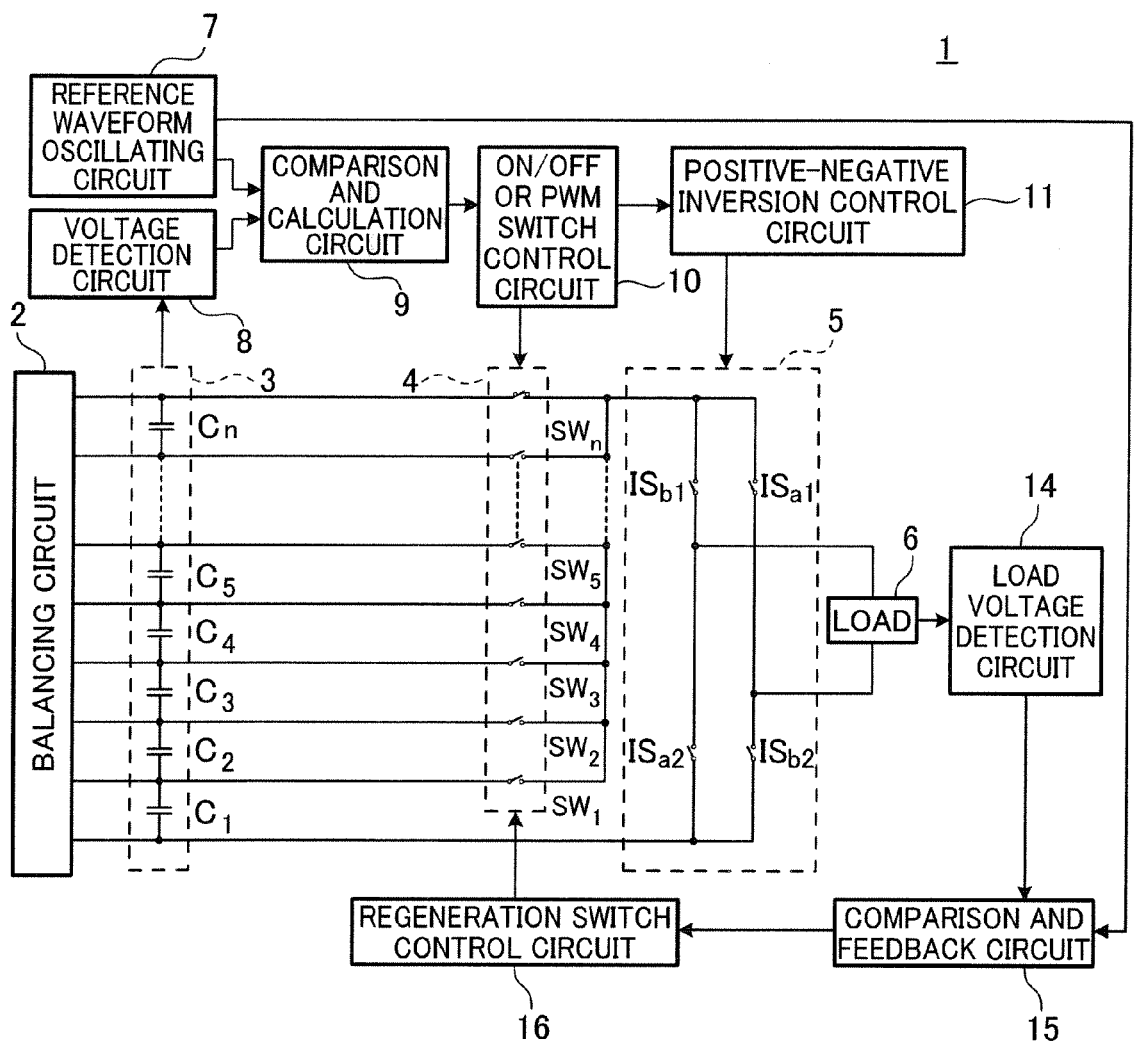
FIG. 12 is a circuit diagram illustrating an electric energy storage apparatus with a regenerative function, according to a third embodiment of the present invention.

FIG. 12 is a circuit diagram illustrating an electric energy storage apparatus 1 with a regenerative function, according to a third embodiment of the present invention. As compared to the electric energy storage apparatus in FIG. 2, the electric energy storage apparatus 1 according to the third embodiment additionally comprises a load voltage detection circuit 14, a comparison and feedback circuit 15 and a regeneration switch control circuit 16.

The electric energy storage apparatus 1 in FIG. 12 is capable of, even if a load voltage deviates from a target voltage value obtained by multiplying a voltage of a reference waveform signal by a preset magnification value, correcting the deviation, and regeneratively returning, to capacitors, excess energy of a load 6 corresponding to the deviated voltage, to compensate for voltage drop in the capacitors to some extent.

Operation of Electric Energy Storage Apparatus 1

Before explaining a regenerative function realizable by the electric energy storage apparatus 1 illustrated in FIG. 12, a load voltage deviation as a factor requiring the regenerative function will be described below.

Figure 10:
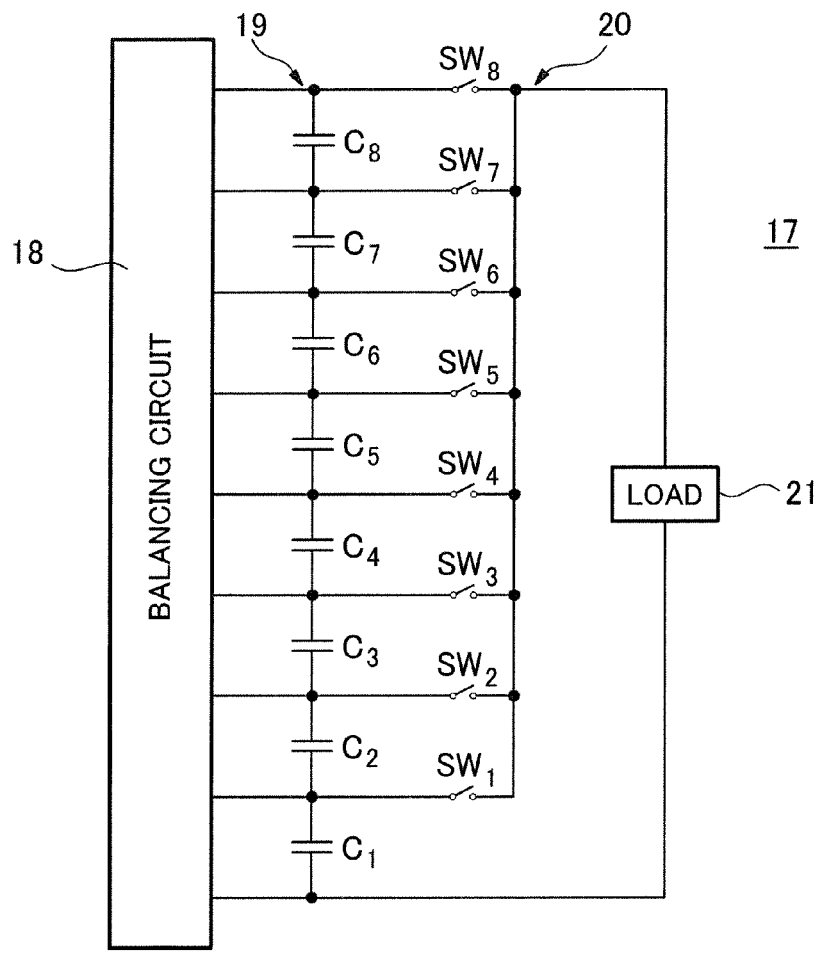
FIG. 10 is a circuit diagram for explaining a load voltage deviation occurring when an output voltage changes over time.

FIG. 10 illustrates one example of an electric energy storage apparatus convenient for explaining a load voltage deviation. The electric energy storage apparatus 17 comprises a balancing circuit 18, a capacitor group 19 composed of eight capacitors $C_1$ to $C_8$, and a switch group 20 composed of eight switches $SW_1$ to $SW_8$, wherein it is configured to turn on one of the switches in a selectively changing-over manner to output a time-dependent voltage to a load 21.

Figure 11:
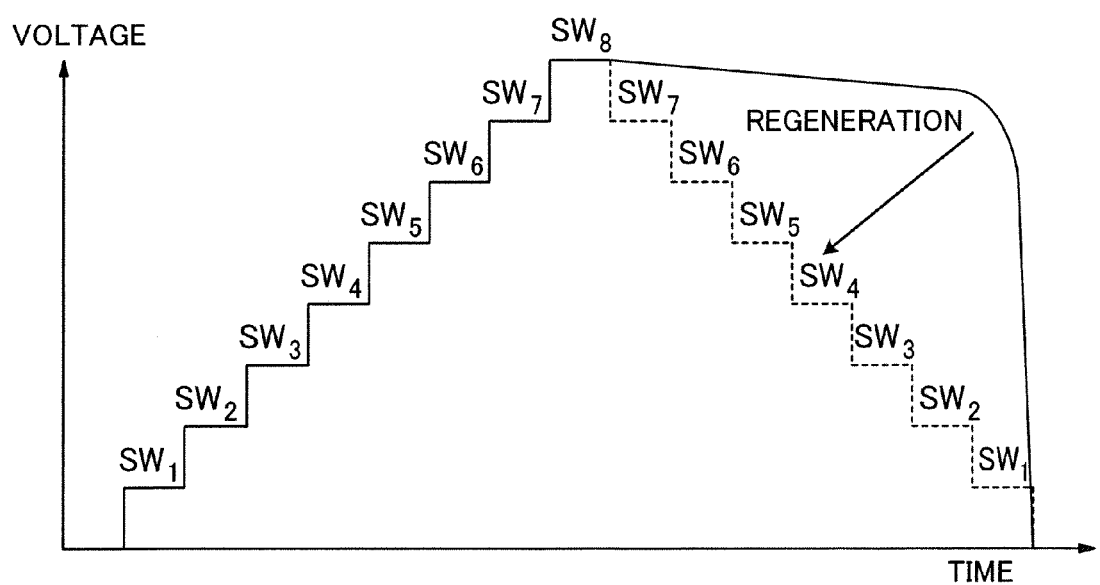
FIG. 11 is a graph illustrating a load voltage deviation occurring when an output voltage changes over time.

FIG. 11 is a graph illustrating a load voltage deviation from a desired value, occurring when the electric energy storage apparatus 17 outputs a voltage changing over time.

In the electric energy storage apparatus 17, when the switches $SW_1$ to $SW_8$ are sequentially turned on in order of $SW_1, SW_2, \ldots, SW_8$, at intervals of a predetermined period of time, a current flows from each of the capacitors through the load 21, so that a load voltage is raised in a stepwise manner. A width of each step corresponds to a voltage across each of the capacitors $C_1$ to $C_8$.

Considering a situation where, after turning on the $SW_8$ to apply a maximum voltage to the load 21, the switches $SW_1$ to $SW_8$ are sequentially turned on in order of $SW_7, SW_6, \ldots, SW_1$, to lower the load voltage in a pattern symmetrical to that during the rising.

In this case, if the load 21 is a desired sufficiently heavy resistor, the load voltage is lowered in a stepwise pattern symmetrical to that during the rising, as indicated by a broken line in FIG. 11. However, if the load 21 comprises a reactive element, such as a coil and a capacitor, or if the load 21 is light, or if the load 21 has a certain reactance component due to its shape, wherein the reactance component is unignorably large as compared to a resistance component, a lowering pattern of the load voltage will deviate from the desired pattern, as indicated by the solid line. As one example, such a deviation occurs when an induced electromotive force is generated within the load 21.

The electric energy storage apparatus 1 in FIG. 12 is capable of correcting such a load voltage deviation from a desired pattern. With a focus on this point, an operation of the electric energy storage apparatus 1 will be described below.

Except for an operation concerning the correction of a load voltage deviation, the electric energy storage apparatus 1 in FIG. 12 operates in the same manner as that in the electric energy storage apparatus illustrated in FIG. 2. Specifically, in a comparison and calculation circuit 9, an instantaneous voltage value of a reference waveform signal input from a reference waveform oscillating circuit 7 is compared with a capacitor voltage input from a voltage detection circuit 8.

Then, the number of capacitors required for contributing to a voltage output to the load is determined depending on a preset magnification value, and a corresponding switch changeover signal is output to a switch group 4 to select a magnitude of an output voltage. Further, a control signal corresponding to a (positive/negative) polarity of the instantaneous voltage value of the reference waveform signal input from the reference waveform oscillating circuit 7 is output to a positive-negative inversion circuit 5 to select a polarity of the output voltage to be applied to the load.

As a new operation to be performed by the electric energy storage apparatus 1 in FIG. 12, the load voltage detection circuit 14 is operable to monitor a voltage across the load 6, and output a signal indicative of a detected voltage to the comparison and feedback circuit 15. Additionally, a signal indicative of a target output voltage is input from the reference waveform oscillating circuit 7 into the comparison and feedback circuit 15. The respective output/input timings of the two signals may be synchronized by a certain external device, or, each of the load voltage detection circuit 14 and the reference waveform oscillating circuit 7 may be configured to output the signal to the comparison and feedback circuit 15 at intervals of a predetermined period of time determined, for example, by a clock frequency set for each of them. Alternatively, signals indicative of the instantaneous voltage value of the reference waveform signal and the preset magnification value may be input from the reference waveform oscillating circuit 7 or any other module constituting the electric energy storage apparatus 1, into the comparison and feedback circuit 15. Alternatively, the electric energy storage apparatus 1 may be configured such that the preset magnification value is preliminarily input into the comparison and feedback circuit 15 directly through an arbitrary external interface.

The comparison and feedback circuit 15 is operable, based on a load voltage informed by the signal from the load voltage detection circuit 14, and a target output voltage informed by the signal from the reference waveform oscillating circuit 7, to calculate a load voltage deviation from the target output voltage. Subsequently, as one example, the comparison and feedback circuit 15 is operable to generate a signal indicative of a difference between the load voltage and the target voltage, and output the signal to the regeneration switch control circuit 16. Alternatively, the comparison and feedback circuit 15 may be configured to, only when the difference between the load voltage and the target voltage is greater than an allowable limit value, output the signal to the regeneration switch control circuit 16.

The regeneration switch control circuit 16 is operable, in response to the signal from the comparison and feedback circuit 15, to output a switch changeover signal to the switch group 4 (when the signal indicative of the difference between the load voltage and the target voltage is input from the comparison and feedback circuit 15, the switch changeover signal is output on condition that a value of the difference is greater than an allowable limit value). When the switch group 4 receives the switch changeover signal, one of the switches set to an ON state to apply the output voltage to the load is opened once, and then one of the switches in the switch group 4 is newly selected and turned on.

In the above operation, the switch $SW_1$ is typically turned on. Consequently, only the capacitor $C_1$ is connected to the load 6, and excess energy is regeneratively returned from the load 6 to the capacitor $C_1$ due to a potential difference therebetween. It is not essential to select the switch $SW_1$ so as to perform the regeneration. However, in view of increasing the potential difference from the load 6 to obtain a higher regenerative speed, it is preferable to select the switch $SW_1$ to minimize the number of ones of the capacitors which are to be connected to the load 6.

In this example, the regeneration of excess energy means discharge from the load 6 to the capacitor $C_1$, so that the voltage across the load 6 is lowered to become closer to the target value, and the voltage across the capacitor $C_1$ is increased.

Voltages across the respective capacitors $C_1$ to $C_n$ are continually adjusted by a balancing circuit 2. Thus, in the electric energy storage apparatus employing the balancing circuit 2 for voltage equalization, the energy charged in the capacitor $C_1$ is distributed over the remaining capacitors $C_2$ to $C_n$ by the balancing circuit 2 to increase those respective capacitor voltages. This makes it possible to extend an operable time of the electric energy storage apparatus 1.

After an elapse of a predetermined time from the turn-on of the switch $SW_1$, the switch $SW_1$ is turn off, and a switch changeover signal is output from the switch control circuit 10 to the switch group 4 so as to return the switch group 4 to a changeover state just before start of the regeneration. The information on the elapse of the predetermined time may be given from a certain external device for controlling an operation timing of the entire electric energy storage apparatus. Alternatively, the electric energy storage apparatus may be configured to output a signal indicative of the elapse of the predetermined time, from the regeneration switch control circuit 16 to the switch control circuit 10.

Instead of using the elapse of the predetermined time as a condition for a switch changeover, the electric energy storage apparatus 1 may be configured such that the load voltage is compared with the target value by the comparison and feedback circuit 15 as needed, while detecting the load voltage by the load voltage detection circuit 14 even during the regeneration operation, and, when a difference between the load voltage and the target value becomes less than an allowable limit value, a control signal is output from the comparison and feedback circuit 15 to the switch control circuit 10 to return the switch group 4 to a changeover state just before start of the regeneration operation.

The subsequent operation is the same as that in the electric energy storage apparatus illustrated in FIG. 2. A magnitude and polarity of the output voltage is adjusted based on momentarily changing inputs from the reference waveform oscillating circuit 7 and the voltage detection circuit 8.

In the third embodiment, a timing of performing the regeneration operation may be arbitrarily set. For example, the electric energy storage apparatus 1 may be configured to perform the regeneration operation at intervals of the same period of time as the predetermined period of time for the adjustment of the output voltage, i.e., in conjunction with each adjustment of the output voltage, based on the inputs from the reference waveform oscillating circuit 7 and the voltage detection circuit 8. Further, the electric energy storage apparatus 1 may be configured to perform the comparison in the comparison and feedback circuit 15 at intervals of a period of time different from the above predetermined period of time.

FOURTH EXAMPLE

Figure 13:
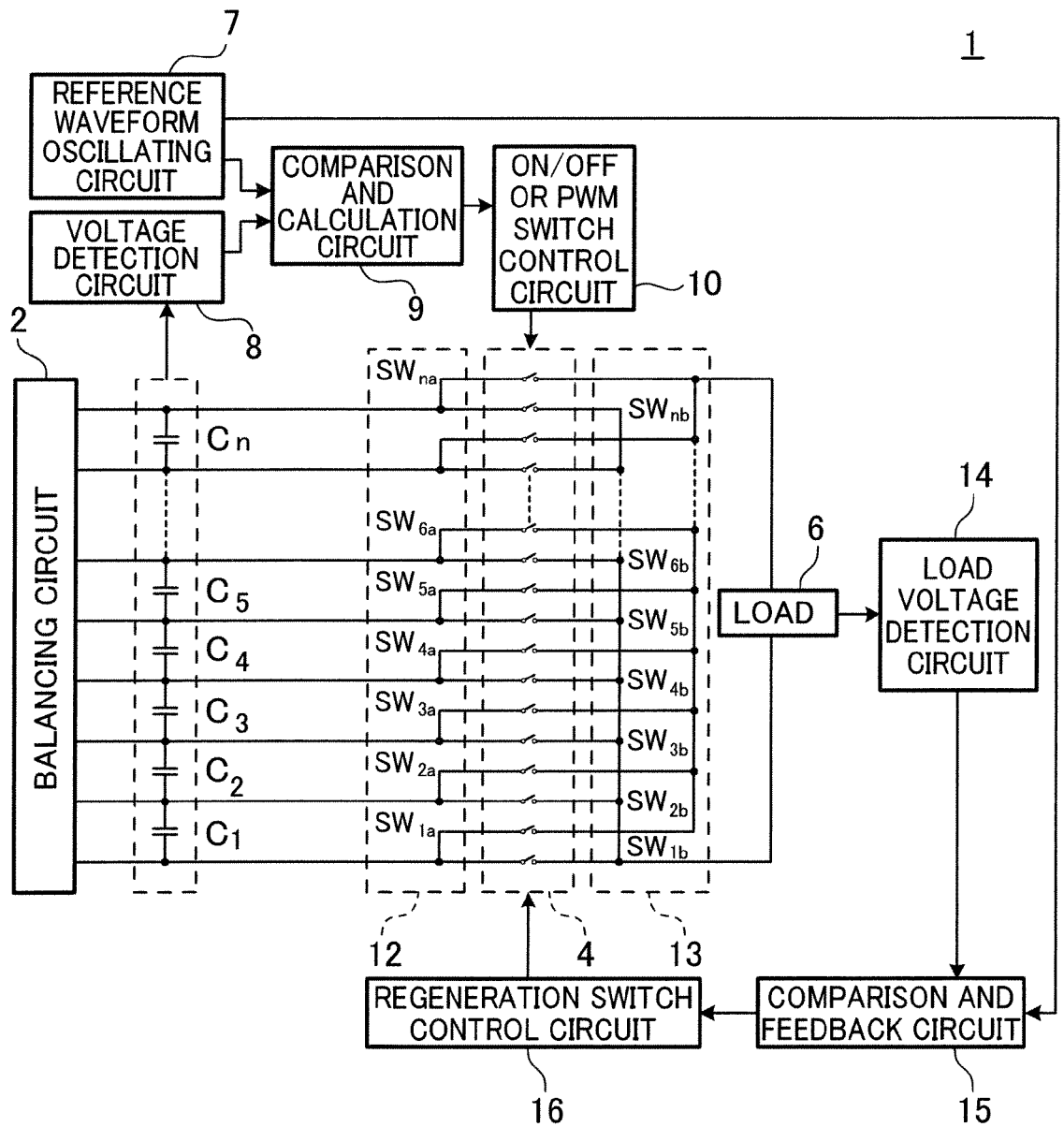
FIG. 13 is a circuit diagram illustrating an electric energy storage apparatus with a regenerative function, according to a fourth embodiment of the present invention.

The configuration for the regeneration operation may be incorporated in the electric energy storage apparatus illustrated in FIG. 7. FIG. 13 illustrates a configuration of this electric energy storage apparatus.

As with the electric energy storage apparatus in FIG. 12, a load voltage detection circuit 14 is operable to monitor a voltage of a load 6, and a comparison and feedback circuit 15 is operable to compare the load voltage with a target value, and, according to a comparison result, to temporarily change a switch group 4 to a switch changeover state for performing a regenerating operation.

In the electric energy storage apparatus illustrated in FIG. 13, the switch group 4 comprises a first switch group 12 and a second switch group 13. Thus, in the regeneration operation, a switch to be turned on is selected from each of the first switch group 12 and the second switch group 13.

In view of a higher regenerative speed, it is preferable to select the switches to apply, to the load 6, a voltage having a reverse polarity with respect to that of the load voltage and a large magnitude. However, this involves a risk of damage to the capacitor due to a large current flowing therein, and a problem that energy of the load 6 is lost beyond a correction range. Thus, the switch changeover state to be employed in the regeneration operation should be set depending on various conditions, such as characteristics of each element and a level of temporal change in the target output voltage, on a case-by-case basis. It will be apparent to those skilled in the art to appropriately perform such a setting according to teaching of the present invention. Therefore, unless otherwise such variations depart from the scope of the present invention hereinafter defined, they should be construed as being included therein.

FIFTH EXAMPLE

A voltage outputting method according to a fifth embodiment of the present invention will be described below. This method may be implemented by using any one of the electric energy storage apparatuses in FIGS. 2, 7, 12 and 13, and designed to finely adjust a substantial output voltage as a meaning of a temporal average value, using a small number of elements.

Figure 14:
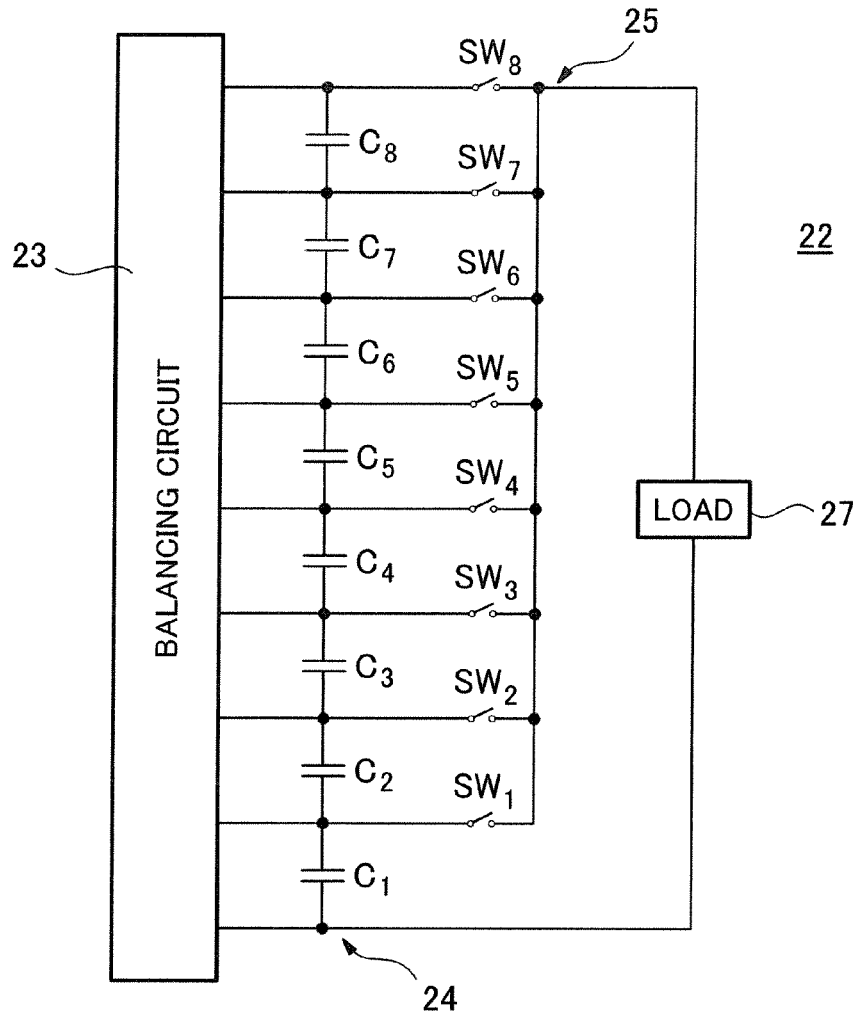
FIG. 14 is a circuit diagram illustrating a certain electric energy storage apparatus to explain a voltage outputting method according to a fifth embodiment of the present invention.
Figure 16:
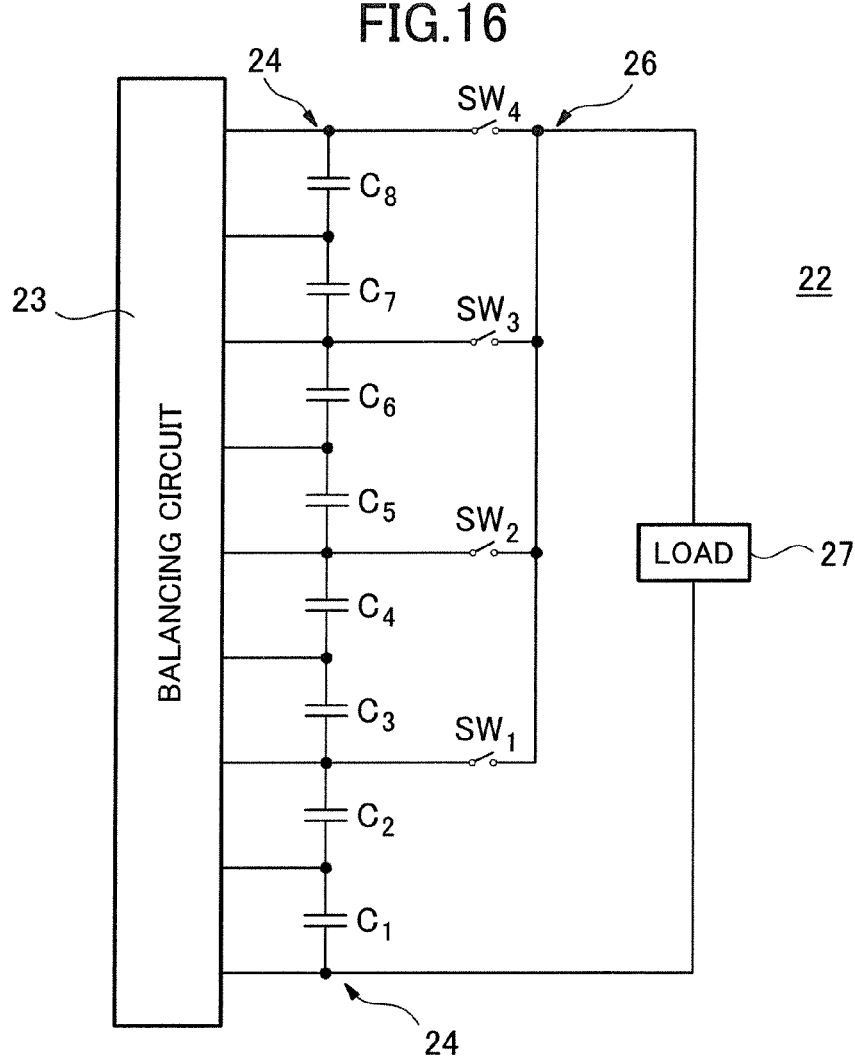
FIG. 16 is a circuit diagram illustrating an electric energy storage apparatus in which the number of switches is reduced to one-half as compared to the electric energy storage apparatus in FIG. 14, and a switch interval is increased two times on the basis of an electric energy storage element.

FIGS. 14 and 16 illustrate examples of an electric energy storage apparatus 22 convenient for explaining a problem with an increment width in output voltage adjustment. In each example, the electric energy storage apparatus 22 comprises a balancing circuit 23, a capacitor group 24 composed of the same number of capacitors $C_1$ to $C_8$, and a switch group 25 (26), wherein it is configured to turn on one of the switches in a selectively changing-over manner to output a time-dependent voltage to a load 27. The switch group 25 is different from the switch group 26 in that the switch group 25 is composed of eight switches $SW_1$ to $SW_8$, whereas the switch group 26 is composed of four switches $SW_1$ to $SW_4$.

In the electric energy storage apparatus 22 illustrated in FIG. 14, the number of capacitors contributing to the output voltage can be selected in increments of one capacitor by turning on one of the switches $SW_1$ to $SW_8$. On the other hand, in the electric energy storage apparatus illustrated in FIG. 15, the number of capacitors contributing to the output voltage can be selected only in increments of two capacitors by turning on one of the switches $SW_1$ to $SW_4$.

Figure 15:
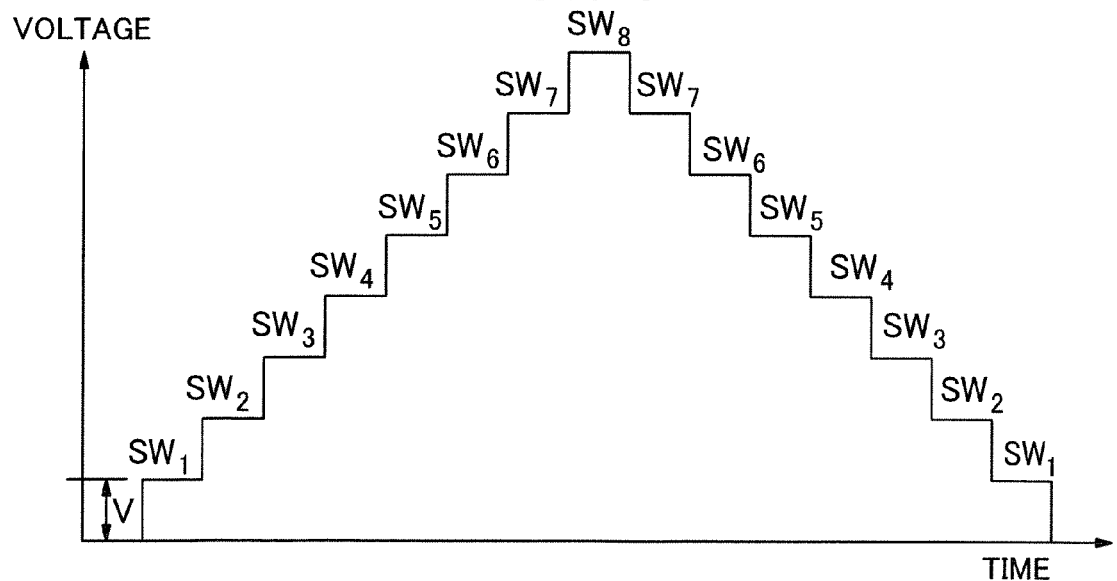
FIG. 15 is a graph illustrating one example of a half-wave waveform voltage to be produced by the electric energy storage apparatus in FIG. 14.

FIG. 15 illustrates an output voltage obtained when the switches in the electric energy storage apparatus in FIG. 14 are sequentially turned on under a condition that the balancing circuit 23 is configured to equalize the capacitor voltages. Assuming that a voltage across each of the capacitors is V, the output voltage is adjusted to (0), V, 2V, . . . , 8V by sequentially turning on the switches in order of (each switch is in an OFF state), $SW_1, SW_2, \ldots, SW_8$, or adjusted to 8V, 7V, . . . V, (0) by sequentially turning on the switches in order of $SW_8$, $SW_7, \ldots SW_1$, (each switch is in the OFF state). In other words, the output voltage is adjusted in increments of V.

Figure 17:
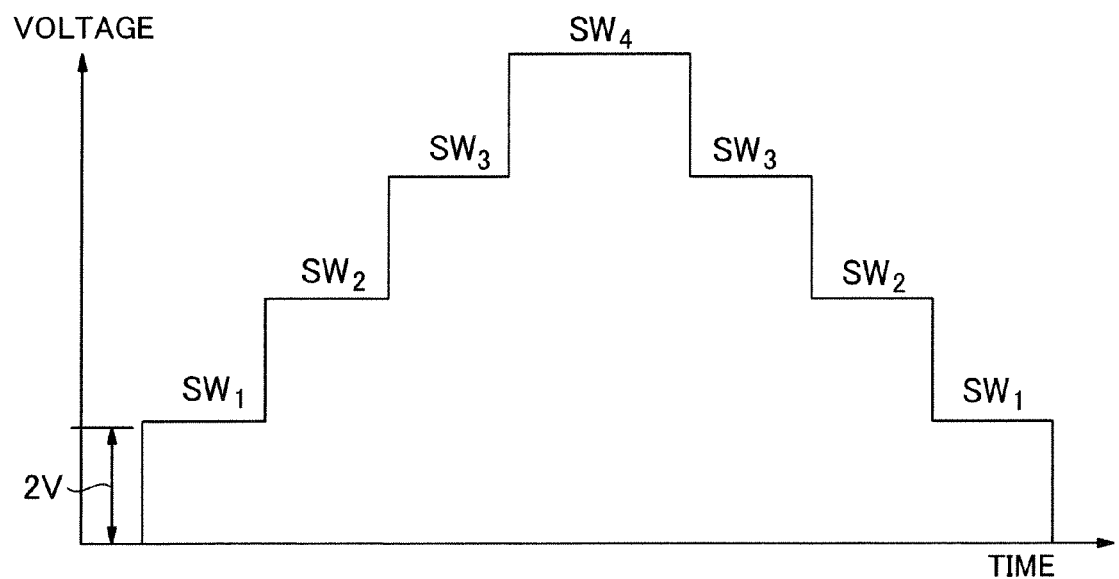
FIG. 17 is a graph illustrating one example of a half-wave waveform voltage to be produced by the electric energy storage apparatus in FIG. 16.

FIG. 17 illustrates an output voltage obtained when the switches in the electric energy storage apparatus in FIG. 16 are sequentially turned on under a condition that the balancing circuit 23 has the same configuration as above. Assuming that a voltage across each of the capacitors is V, the output voltage is adjusted to (0), 2V, 4V, . . . , 8V by sequentially turning on the switches in order of (each switch is in an OFF state), $SW_1, SW_2, \ldots, SW_4$, or adjusted to 8V, 6V, . . . 2V, (0) by sequentially turning on the switches in order of $SW_4$, $SW_3, \ldots SW_1$, (each switch is in the OFF state). In other words, the output voltage is adjusted in increments of 2V. This means that, if the number of switches is reduced, it becomes impossible to finely adjust the output voltage in increments of a voltage across each of the capacitors.

The present invention solves this problem by pulse width modulation control (PWM control). Specifically, the preset invention makes it possible to adjust a substantial output voltage as a meaning of a temporal average value, in increments of a voltage across one capacitor, in each of the electric energy storage apparatuses illustrated in FIGS. 2, 7, 12 and 13, even if a switch is provided for respective two of the series-connected capacitors as in the electric energy storage apparatus illustrated in FIG. 16. The method will be described based on an example where the number of switches becomes half in the electric energy storage apparatus illustrated in FIG. 2, i.e., based on an electric energy storage apparatus 1 illustrated in FIG. 19 (this method may be implemented in each of the electric energy storage apparatuses illustrated in FIGS. 7, 12 and 13, according to the sample principle).

In this method, after completion of one cycle of the output voltage adjustment based on the switch changeover in the switch group 4 and the selection of the output terminals in the positive-negative inversion circuit 5, as a part of the operation described in connection with the first embodiment, etc., a high-speed changeover in a switch group 4 is performed in a first half of a predetermined time before start of a next cycle of the output voltage adjustment.

Typically, a step of turning off all of the switches, and a step of re-turning on each of the switches which has been turned on in the previous cycle of the output voltage adjustment, will be repeated plural times, at a given time interval ratio therebetween.

Figure 19:
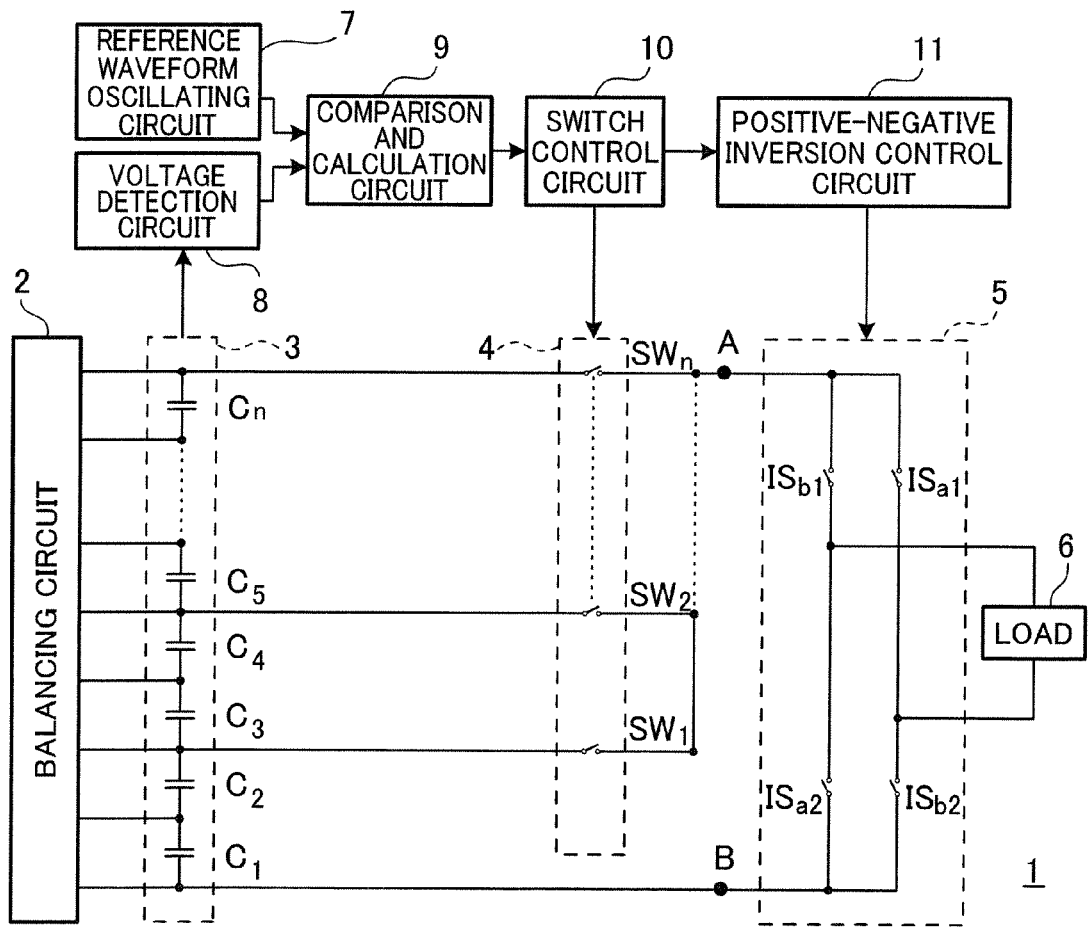
FIG. 19 is a circuit diagram illustrating an electric energy storage apparatus implementing a method of the present invention and capable of finely adjusting an output voltage using a small number of switches.

Specifically, in cases where, in the electric energy storage apparatus 1 illustrated in FIG. 19, the switches in the switch group 4 are sequentially turned on in order of (each switch is in the OFF state), $SW_1, SW_2, \ldots, SW_4, SW_3, \ldots, SW_1$, (each switch is in OFF state) to output a voltage having the same waveform as that in FIG. 17, a high-speed changeover is performed between a state in which all of the switches are turned off and a state in which the switch $SW_1$ is turned on, in a first half of a time (predetermined time) between turn-on of the switch $SW_1$ and turn-on of the switch $SW_2$. In cases where each changeover is performed at even time intervals, a temporal average voltage value in the first half of the predetermined time is V, whereas a temporal average voltage value in a second half of the predetermined time where the high-speed changeover is not performed, is 2V. In other words, as compared to the case where the high-speed changeover is not performed, the increments for adjustment of the substantial voltage as meaning of a temporal average value can be reduced to ½.

In the same manner, a high-speed changeover is performed between a state in which all of the switches are turned off and a state in which the switch $SW_2$ is turned on, in a first half of a time (predetermined time) between turn-on of the switch $SW_2$ and turn-on of the switch $SW_3$. In cases where each changeover is performed at a time interval ratio of 1:3, a temporal average voltage value in the first half of the predetermined time is 3V, whereas a temporal average voltage value in a second half of the predetermined time where the high-speed changeover is not performed, is 4V. In other words, as compared to the case where the high-speed changeover is not performed, the increments for adjustment of the substantial voltage as meaning of a temporal average value can be reduced to ½.

Figure 18:
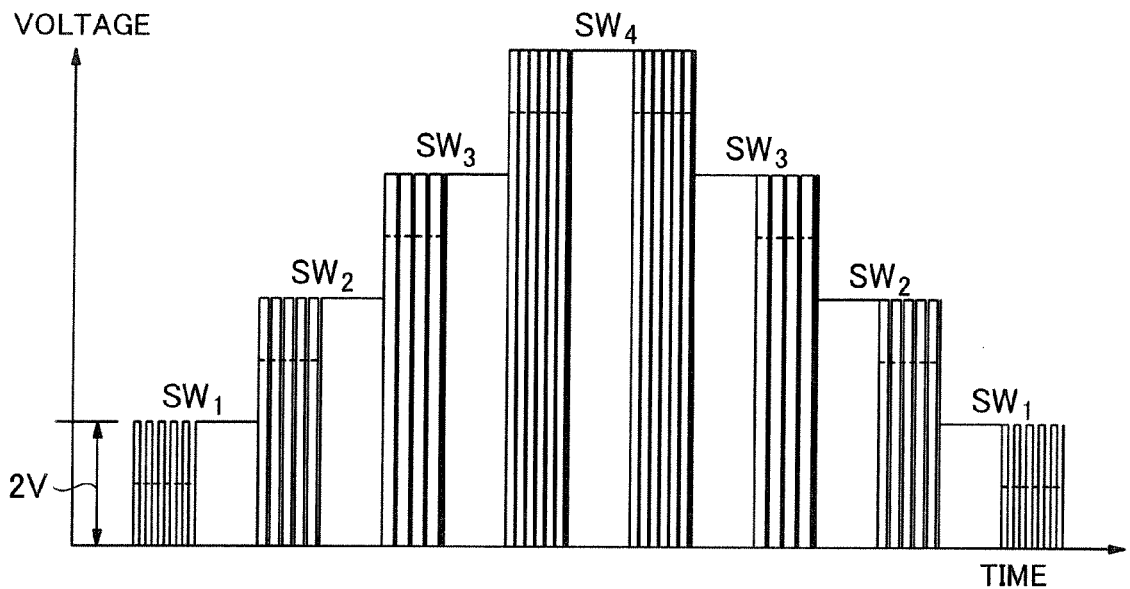
FIG. 18 is a graph illustrating one example of a half-wave waveform voltage to be produced by PWM-controlling the electric energy storage apparatus in FIG. 16.

In the subsequent switch changeover, a high-speed changeover is performed in the same manner, so that it becomes possible to substantially reduce the increments for the adjustment to ½ so as to finely adjust the output voltage. FIG. 18 illustrates a temporal voltage change obtained when the above method is employed.

In the above high-speed changeover, the time interval ratio in each changeover operation may be arbitrarily set. The increments for the adjustment can be substantial adjusted to any rate other than ½ by adjusting the time interval ratio to an arbitrary value.

In addition, it is not essential that the high-speed changeover is performed, as discussed above, between the state in which all of the switches are turned off and the state in which the switch which has been selected in the output voltage adjustment is turned on. In other words, a temporal average voltage value during the high-speed changeover can be controlled to a desired value by selecting an arbitrary number of any changeover states (without limiting the number to two), and arbitrarily setting a time interval of each changeover. Further, it is not essential that the high-speed changeover is performed in a front half of a predetermined time.

SIXTH EXAMPLE

Each of the electric energy storage apparatuses according to the first to fifth embodiments is configured to adjust voltages of the respective capacitors, i.e., adjust the increments for adjustment of the output voltage, by using the balancing circuit.

However, a constant-voltage DC power supply may be connected to each of the capacitors to adjust voltages of the respective capacitors without using the balancing circuit.

Figure 20:
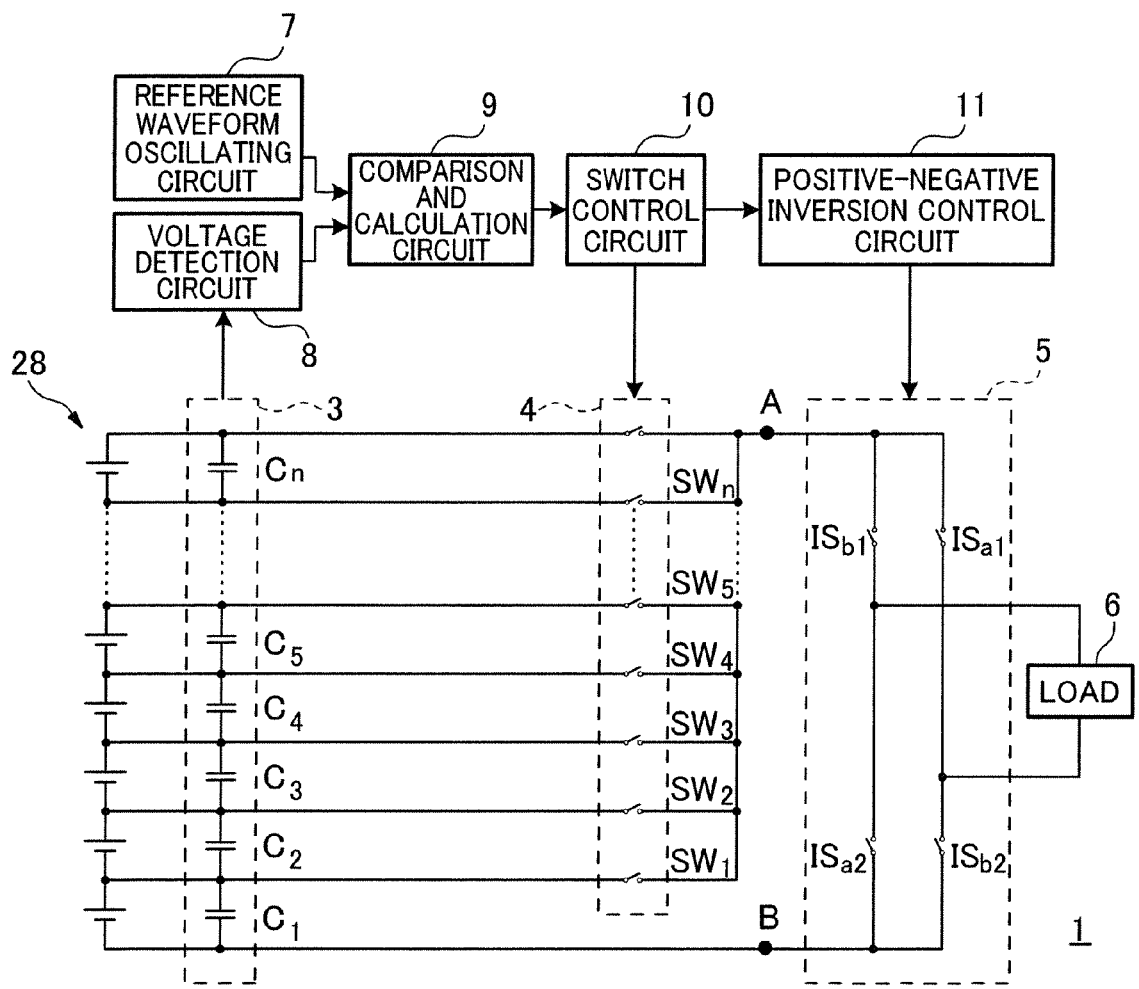
FIG. 20 is a circuit diagram illustrating an electric energy storage apparatus according to a sixth embodiment of the present invention, wherein a constant-voltage DC power supply is connected to each electric energy storage module, in place of the balancing circuit.
Figure 21:
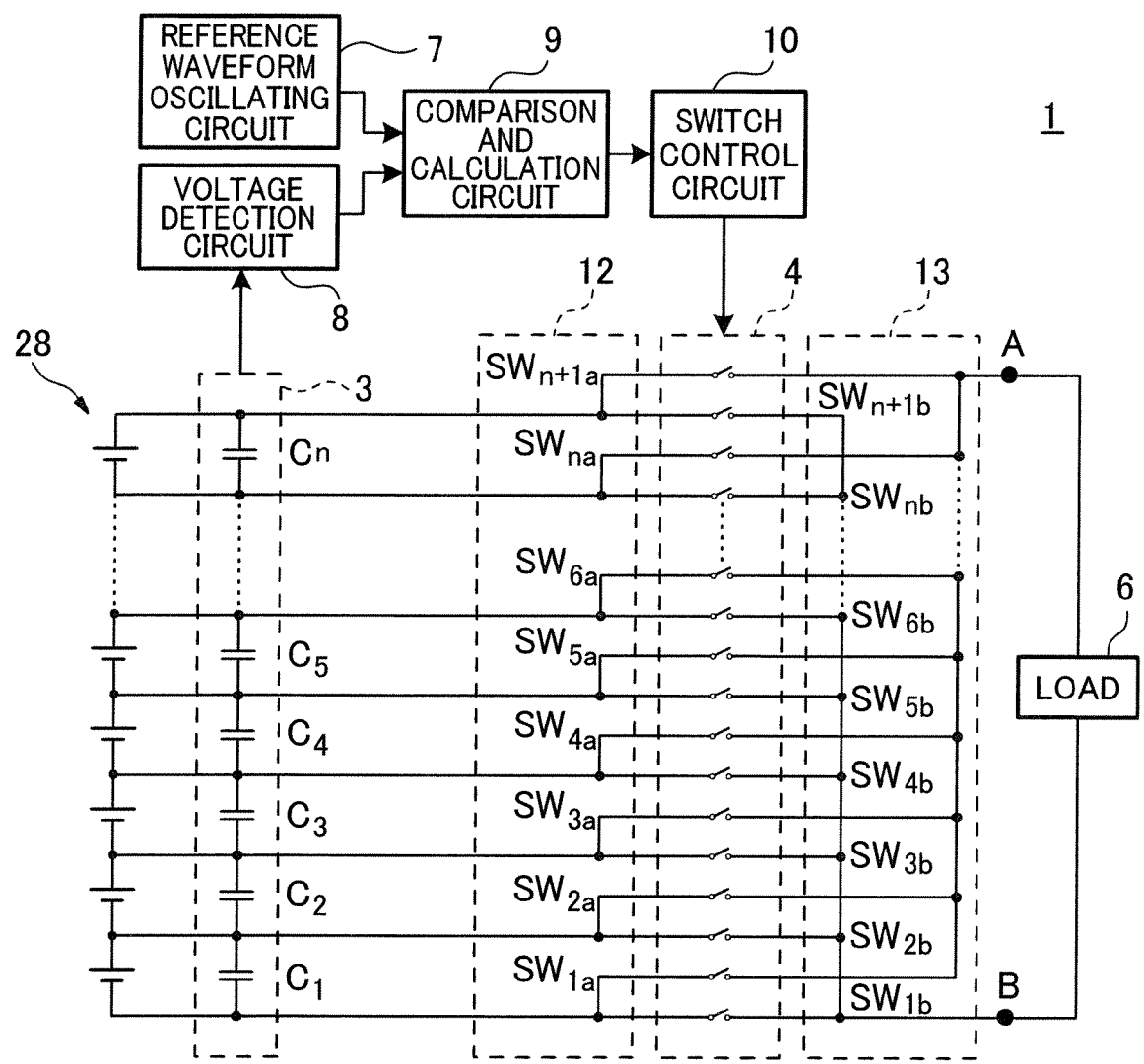
FIG. 21 is a circuit diagram illustrating an electric energy storage apparatus according to the sixth embodiment of the present invention, wherein a constant-voltage DC power supply is connected to each electric energy storage module, in place of the balancing circuit.

FIG. 20 and FIG. 21 illustrate two configurations formed by connecting a constant-voltage DC power supply 28 to each of the capacitors, instead of using the balancing circuit, respectively, in the electric energy storage apparatuses 1 illustrated in FIG. 2 and FIG. 7.

Such the electric energy storage apparatuses 1 can also output a DC or AC voltage according to the same principle as that in the first and second embodiments, and may further comprise means for regeneratively retuning excess energy according to the same principle as that in the third and fifth embodiments. Further, the electric energy storage apparatuses 1 may be used to finely adjust the output voltage as in the fifth embodiment.

The electric energy storage apparatus 1 where a constant-voltage DC power supply is connected to each of the capacitors is free of the need for taking into account a voltage drop in each of the electric energy storage modules due to discharging, so that it becomes possible to simplify the control of the electric energy storage apparatus 1, as comported to the first and second embodiment.

The electric energy storage apparatus of the present invention does not use a DC-DC converter, an inverter or the like, so that it becomes possible to output a voltage having an arbitrary pattern in a low-loss and low-noise manner, irrespective of whether it is a DC voltage or an AC voltage. Thus, the electric energy storage apparatus of the present invention can be used as a highly-efficient power supply for any electrically-operated device. The electric energy storage apparatus employs, as a major element, a capacitor having a simple mechanism, and therefor low in maintenance cost. Thus, also in view of the high efficiency, it is suitable for use in the field of solar cells.

ADDITIONAL STATEMENT

As the aforementioned balancing circuit 2 for use in the electric energy storage apparatus 1 of the present invention, a circuit comprising an electric energy storage module disclosed in JP 2008-219964A (JP 2007-49692; JP 4352183B) may be used, as described in the embodiments above. As one example of such a circuit, a circuit disclosed in FIG. 7 of JP 2008-219964A will be described below.

Figure 22:
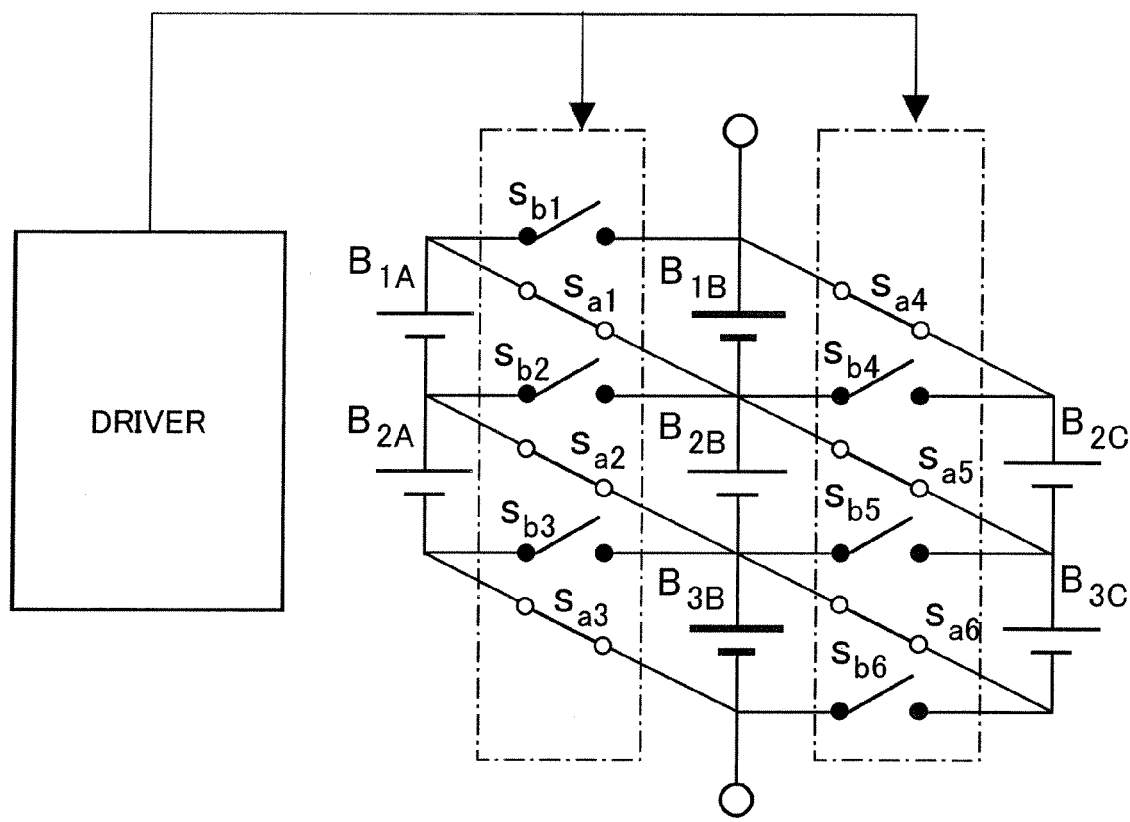
FIG. 22 is a circuit diagram illustrating an example of a cell voltage equalization circuit usable as one example of the balancing circuit.

FIG. 22 is a circuit diagram illustrating one embodiment of a cell voltage equalization circuit disclosed in FIG. 7 of JP 2008-219964A. This equalization circuit uses a secondary battery cell as an electric energy storage cell, and has 3-series circuit configuration formed by connecting 3 series circuits in parallel, to have parallel rows consisting of 2-parallel row—3-parallel row—2-parallel row. Each of $B_{1A}$ to $B_{2A}$, $B_{1B}$ to $B_{3B}$, and $B_{2C}$ to $B_{3C}$, is a cell. $B_{1B}$ and $B_{3B}$ is a cell having a capacity of $2_X$, and each of the remaining cells has a capacity of $_X$. Each of $S_{a1}$ to $S_{a6}$ and $S_{b1}$ to $SB_{b6}$ is a semiconductor switch. Two groups of semiconductor switches, i.e., a $S_a$ group and an $S_b$ group, are alternately turned on/off by using a driver, to change a combination of cells to be connected in parallel in the module, so that the cells in the module are subjected to mutual charging and discharging, to allow voltages across the respective cells to be equalized. The on/off operation using the driver may be performed in a constant cycle. Further, the cycle may be changed depending on temporal change and/or load change.

Figure 23:
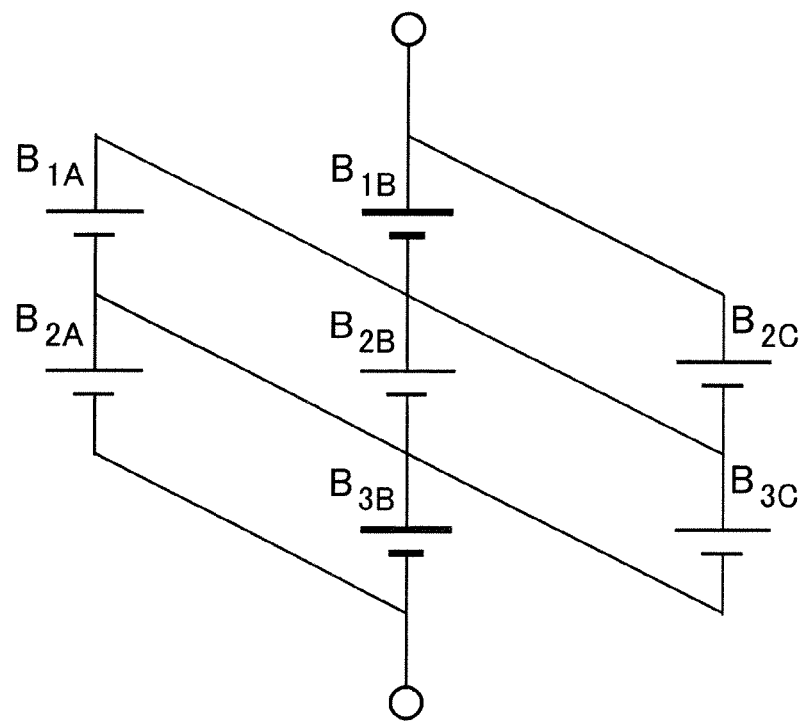
FIG. 23 is a circuit diagram illustrating the circuit in FIG. 22, wherein each switch in an $S_a$ group is in an ON state, and each switch in an $S_b$ group is in an OFF state.

FIG. 23 is a circuit diagram illustrating the equalization circuit, wherein the switches in the $S_a$ group are in an ON state, and the switches in the $S_b$ group are in an OFF state. In this mode, $B_{1A}$, $B_{2B}$ and $B_{3C}$; $B_{2A}$ and $B_{3B}$; and $B_{1B}$ and $B_{2C}$; are connected in parallel, respectively, to form a 3-series circuit configuration formed by connecting 3 series circuits in parallel, to have parallel rows consisting of 2-parallel row—3-parallel row—2-parallel row. In this connection mode, a composite capacity in each parallel row is equally $3_X$. Thus, if a variation in voltage occurs between the parallel-connected cells, mutual charging and discharging are performed, so that the voltage variation will move toward being eliminated.

Figure 24:
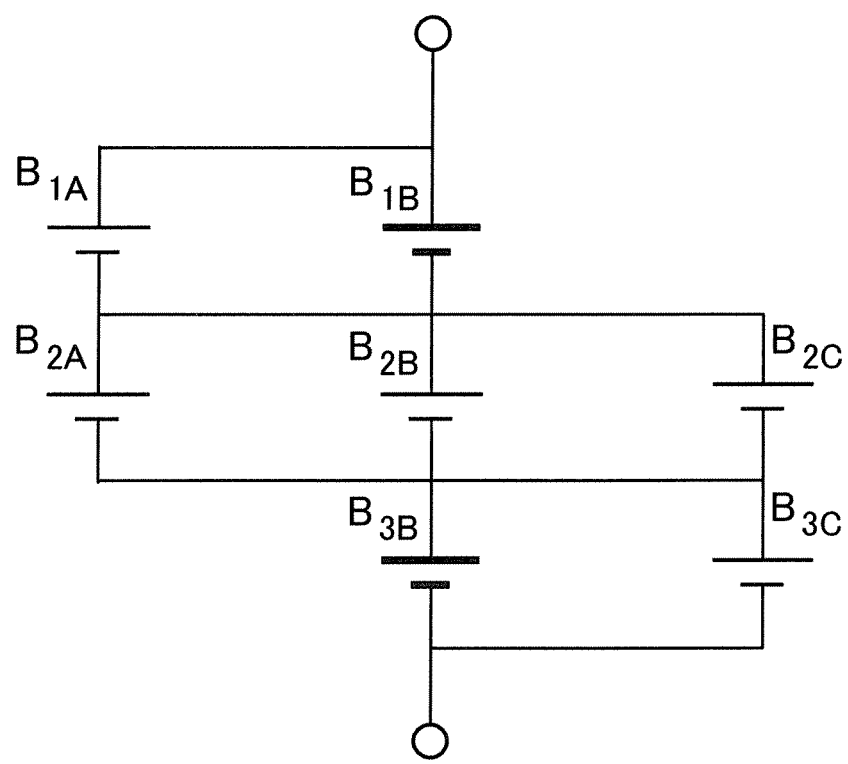
FIG. 24 is a circuit diagram illustrating the circuit in FIG. 22, wherein each switch in the $S_a$ group is in an OFF state, and each switch in the $S_b$ group is in an ON state.

FIG. 24 is a circuit diagram illustrating the equalization circuit, wherein the switches in the $S_a$ group are in an OFF state, and the switches in the $S_b$ group are in an ON state. In this mode, $B_{1A}$ and $B_{1B}$; $B_{2A}$, $B_{2B}$ and $B_{2C}$; and $B_{3B}$ and $B_{3C}$; are connected in parallel, respectively, to form a 3-series circuit configuration formed by connecting 3 series circuits in parallel, to have parallel rows consisting of 2-parallel row—3-parallel row—2-parallel row. In this connection mode, a composite capacity in each parallel row is equally $3_X$. Thus, if a variation in voltage occurs between the parallel-connected cells, mutual charging and discharging are performed, so that the voltage variation will move toward being eliminated.

Based on repeating the above switch on/off operation, the combination of series-connected and parallel-connected cells are changed to allow each of the cells in the module to be connected in parallel with each of the remaining cells, while maintaining a 3-series circuit configuration formed by connecting 3 series circuits in parallel, to have parallel rows consisting of 2-parallel row—3-parallel row—2-parallel row, and maintaining a composite capacity in each parallel row equally ($3_x$), so that it becomes possible to perform mutual charging and discharging between the parallel-connected cells to equalize voltages across the respective cells.

The cell voltage equalization circuit in FIG. 22 is simply illustrated by way of example, a similar balancing circuit may be formed as a 4 or more-series circuit configuration and used in the electric energy storage apparatus 1 of the present invention.

In one aspect, an electric energy storage apparatus is capable of generating an AC output in a low-loss and low-noise manner without using a DC-DC converter or an inverter. The electric energy storage apparatus comprises: an electric energy storage module group formed by connecting in series two or more electric energy storage modules each comprising one or more electric energy storage elements; a balancing circuit electrically connected to the electric energy storage module group and configured to adjust a voltage to be applied to each of the electric energy storage modules; a first switch group comprising two or more switches each provided in a path connecting a first terminal and a terminal of one of the series-connected electric energy storage modules; and a second switch group comprising two or more switches each provided in a path connecting a second terminal and a terminal of one of the series-connected electric energy storage modules. The electric energy storage apparatus is configured to perform a switch changeover in the first and second switch groups so as to select a magnitude and polarity of an output voltage depending on a configuration of the electric energy storage elements present in a path connecting the first and second terminals.

Although some embodiments of the invention have been shown and described by way of example, it is obvious to those skilled in the art that various changes and modifications may be made therein without departing from the spirit and scope thereof as set forth in the appended claims.

EXPLANATION OF CODES

1: electric energy storage apparatus
2: balancing circuit
3: electric energy storage module group
4: switch group
5: positive-negative inversion circuit
6: load
7: reference waveform oscillating circuit
8: voltage detection circuit
9: comparison and calculation circuit
10: switch control circuit
11: positive-negative inversion control circuit
12: first switch group
13: second switch group
14: load voltage detection circuit
15: comparison and feedback circuit
16: regeneration switch control circuit
17: electric energy storage apparatus
18: balancing circuit
19: capacitor group
20: switch group
21: load
22: electric energy storage apparatus
23: balancing circuit
24: capacitor group
25, 26: switch group
27: load
28: constant-voltage DC power supply

What is claimed is:

1. An electric energy storage apparatus comprising:
an electric energy storage module group formed by connecting in series two or more electric energy storage modules each comprising one or more electric energy storage elements;
a balancing circuit electrically connected to the electric energy storage module group and configured to adjust a voltage to be applied to each of the electric energy storage modules;
a switch group comprising two or more switches each provided in a path connecting a first connection point and a terminal of one of the series-connected electric energy storage modules; and
a positive-negative inversion circuit having, as an input section, the first connection point and a second connection point electrically connected to one of the terminals of the series-connected electric energy storage modules, the positive-negative inversion circuit being configured to connect the first connection point and the second connection point to one of output terminals respectively,
wherein the electric energy storage apparatus is configured to perform a switch changeover in the switch group so as to select a magnitude of an output voltage depending on a configuration of the electric energy storage elements present in a path connecting the first and second connection points, and cause the positive-negative inversion circuit to select a polarity of the output voltage depending on the output terminals connected to respective ones of the first and second connection points.

2. An electric energy storage apparatus comprising:
an electric energy storage module group formed by connecting in series two or more electric energy storage modules each comprising one or more electric energy storage elements, each of the electric energy storage modules being connected to a DC power supply;
a switch group comprising two or more switches each provided in a path connecting a first connection point and a terminal of one of the series-connected electric energy storage modules; and
a positive-negative inversion circuit having, as an input section, the first connection point and a second connection point electrically connected to one of the terminals of the series-connected electric energy storage modules, the positive-negative inversion circuit being configured to connect the first connection point and the second connection point to one of output terminals respectively,
wherein the electric energy storage apparatus is configured to perform a switch changeover in the switch group so as to select a magnitude of an output voltage depending on a configuration of the electric energy storage elements present in a path connecting the first and second connection points, and cause the positive-negative inversion circuit to select a polarity of the output voltage depending on the output terminals connected to respective ones of the first and second connection points.

3. The electric energy storage apparatus as defined in claim 1, which further comprises:
voltage detection means configured to detect a voltage across the electric energy storage module;
first switch-group control means configured to, based on the electric energy storage module voltage detected by the voltage detection means, and a voltage magnitude in a target output voltage waveform at a certain clock time, turn on one of the switches comprised in the switch group; and positive-negative inversion circuit control means configured to, based on a voltage polarity in the target output voltage waveform at the certain clock time, select the output terminals to be connected to the first connection point and the second connection point, in the positive-negative inversion circuit, wherein the electric energy storage apparatus is configured to, depending on the magnitude and polarity of the target output voltage waveform, and the electric energy storage module voltage, control the switch group and the positive-negative inversion circuit to output a voltage having the target output voltage waveform.

4. The electric energy storage apparatus as defined in claim 1, which further comprises:

voltage detection means configured to detect a voltage across a load connected to the output terminals;

first switch-group control means configured to, based on the load voltage detected by the voltage detection means, and a voltage magnitude in a target output voltage waveform at a certain clock time, turn on one of the switches comprised in the switch group; and positive-negative inversion circuit control means configured to, based on a voltage polarity in the target output voltage waveform at the certain clock time, select the output terminals to be connected to the first connection point and the second connection point, in the positive-negative inversion circuit, wherein the electric energy storage apparatus is configured to, depending on the magnitude and polarity of the target output voltage waveform, and the load voltage, control the switch group and the positive-negative inversion circuit to output a voltage having the target output voltage waveform.

5. The electric energy storage apparatus as defined in claim 1, which further comprises:

load voltage detection means configured to detect a voltage across a load connected to the output terminals; and second switch-group control means configured to, based on a voltage in the target output voltage waveform at a certain clock time, and a load voltage detected at the certain clock time by the load voltage detection means, turn on one of the switches comprised in the switch group, wherein the electric energy storage apparatus is configured to adjust the load voltage to conform to the voltage in the target output voltage waveform at the certain clock time, by charging and discharging between the load and the electric energy storage module connected to the load through the switch turned on by the second switch-group control means.

6. A method of outputting a voltage using the electric energy storage apparatus as defined in claim 1, comprising the steps of:

inputting a reference waveform signal from reference waveform outputting means;

based on the reference waveform signal, determining a voltage magnitude and polarity in a target output voltage waveform at a certain clock time;

based on the electric energy storage module voltage, and the voltage magnitude in the target output voltage waveform at the certain clock time, turning on one of the switches comprised in the switch group; and based on the voltage polarity in the target output voltage waveform at the certain clock time, selectively connecting each of the first connection point and the second connection point to one of the output terminals, in the positive-negative inversion circuit, wherein a magnitude and polarity of the output voltage are selected at intervals of a predetermined period of time to adjust the output voltage to conform to the target output voltage waveform.

7. The method as defined in claim 6, which comprises a step of performing a switchover among at least two states selected from the group consisting of a state in which all of the switches in the switch group are turned off and all of states in which any one of the switches in the switch group is turned on, once or more within the predetermined period of time, to adjust a temporal average value of the output voltage within the predetermined period of time.

8. An electric energy storage apparatus comprising:

an electric energy storage module group formed by connecting in series two or more electric energy storage modules each comprising one or more electric energy storage elements;

a balancing circuit electrically connected to the electric energy storage module group and configured to adjust a voltage to be applied to each of the electric energy storage modules;

a first switch group comprising two or more switches each provided in a path connecting a first terminal and a terminal of one of the series-connected electric energy storage modules; and a second switch group comprising two or more switches each provided in a path connecting a second terminal and a terminal of one of the series-connected electric energy storage modules, wherein the electric energy storage apparatus is configured to perform a switch changeover in the first and second switch groups so as to select a magnitude and polarity of an output voltage depending on a configuration of the electric energy storage elements present in a path connecting the first and second terminals.

9. An electric energy storage apparatus comprising:

an electric energy storage module group formed by connecting in series two or more electric energy storage modules each comprising one or more electric energy storage elements, each of the electric energy storage modules being connected to a DC power supply;

a first switch group comprising two or more switches each provided in a path connecting a first terminal and a terminal of one of the series-connected electric energy storage modules;

a second switch group comprising two or more switches each provided in a path connecting a second terminal and a terminal of one of the series-connected electric energy storage modules, wherein the electric energy storage apparatus is configured to perform a switch changeover in the first and second switch groups so as to select a magnitude and a polarity of an output voltage depending on a configuration of the electric energy storage elements present in a path connecting the first and second terminals.

10. The electric energy storage apparatus as defined in claim 8, which further comprises:

voltage detection means configured to detect a voltage across the electric energy storage module; and first switch-group control means configured to, based on the electric energy storage module voltage detected by the voltage detection means, and a voltage in a target output voltage waveform at a certain clock time, turn on one of the switches comprised in a respective one of the first and second switch groups, wherein the electric energy storage apparatus is configured to, depending on a magnitude and polarity of the target output voltage waveform, and the electric energy storage module voltage, control the first and second switch groups to output a voltage having the target output voltage waveform.

11. The electric energy storage apparatus as defined in claim 8, which further comprises:
   voltage detection means configured to detect a voltage across a load connected to the electric energy storage apparatus; and
   first switch-group control means configured to, based on the load voltage detected by the voltage detection means, and a voltage in a target output voltage waveform at a certain clock time, turn on one of the switches comprised in a respective one of the first and second switch groups,
   wherein the electric energy storage apparatus is configured to, depending on a magnitude and polarity of the target output voltage waveform, and the load voltage, control the first and second switch groups to output a voltage having the target output voltage waveform.

12. The electric energy storage apparatus as defined in claim 8, which further comprises:
   load voltage detection means configured to detect a voltage across a load connected to the electric energy storage apparatus; and
   second switch-group control means configured to, based on a voltage in the target output voltage waveform at a certain clock time, and a load voltage detected at the certain clock time by the load voltage detection means, turn on one of the switches comprised in a respective one of the first and second switch groups,
   wherein the electric energy storage apparatus is configured to adjust the load voltage to conform to the voltage in the target output voltage waveform at the certain clock time, by charging and discharging between the load and the electric energy storage module connected to the load through the switches turned on by the second switch-group control means.

13. A method of outputting a voltage using the electric energy storage apparatus as defined in claim 8, comprising the steps of:
   inputting a reference waveform signal from reference waveform outputting means;
   based on the reference waveform signal, determining a voltage magnitude and polarity in a target output voltage waveform at a certain clock time; and
   based on the electric energy storage module voltage, and the voltage magnitude and polarity in the target output voltage waveform at the certain clock time, turning on one of the switches comprised in a respective one of the first and second switch groups,
   wherein a magnitude and polarity of the output voltage are selected at intervals of a predetermined period of time to adjust the output voltage to conform to the target output voltage waveform.

14. The method as defined in claim 13, which comprises a step of performing a switchover among at least two states selected from the group consisting of a state in which all of the switches in the first or second switch group are turned off and all of states in which any one of the switches in a respective one of the first and second switch groups is turned on, once or more within the predetermined period of time to adjust a temporal average value of the output voltage within the predetermined period of time.

15. The electric energy storage apparatus as defined in claim 1, wherein at least one of the one or more electric energy storage elements is a capacitor or a secondary battery.

* * * * *